(12) United States Patent
Mizunuma et al.

(10) Patent No.: US 12,196,327 B2
(45) Date of Patent: Jan. 14, 2025

(54) VALVE DEVICE

(71) Applicant: DENSO CORPORATION, Kariya (JP)

(72) Inventors: Takehito Mizunuma, Kariya (JP); Shota Kimura, Kariya (JP); Ryo Sano, Kariya (JP); Hiroki Shimada, Kariya (JP)

(73) Assignee: DENSO CORPORATION, Kariya (JP)

( * ) Notice: Subject to any disclaimer, the term of this patent is extended or adjusted under 35 U.S.C. 154(b) by 122 days.

(21) Appl. No.: 18/194,220

(22) Filed: Mar. 31, 2023

(65) Prior Publication Data

US 2023/0279958 A1 Sep. 7, 2023

Related U.S. Application Data

(63) Continuation of application No. PCT/JP2021/033320, filed on Sep. 10, 2021.

(30) Foreign Application Priority Data

Oct. 2, 2020 (JP) ................................ 2020-167777

(51) Int. Cl.
*F16K 11/074* (2006.01)
*F16K 3/34* (2006.01)
(Continued)

(52) U.S. Cl.
CPC .............. *F16K 11/074* (2013.01); *F16K 3/34* (2013.01); *F16K 27/045* (2013.01);
(Continued)

(58) Field of Classification Search
CPC ........ F16K 11/074; F16K 27/045; F16K 3/34; F16K 31/041; F16K 31/535; F16K 3/08; F16K 27/047; Y10T 137/86533
See application file for complete search history.

(56) References Cited

U.S. PATENT DOCUMENTS 1,615,462 A * 1/1927 Lorraine ................... F16K 3/34
137/411
5,775,373 A * 7/1998 Pawelzik .............. F16K 11/074
137/625.3
(Continued)

OTHER PUBLICATIONS

U.S. Appl. No. 18/295,401 to Naoki Asano filed Apr. 4, 2023 (68 pages).

*Primary Examiner* — Craig M Schneider
*Assistant Examiner* — Christopher D Ballman
(74) *Attorney, Agent, or Firm* — Nixon & Vanderhye P.C.

(57) ABSTRACT

A valve device includes a housing, a flow hole forming portion and a rotor. The housing has a passage for fluid. The flow hole forming portion is fixed at the passage and includes: a plurality of flow holes, each of which is configured to conduct the fluid; and at least one partition which is placed between corresponding adjacent two of the flow holes. The rotor includes a passage opening and a closing portion. The at least one partition of the flow hole forming portion has: a parallel portion which extends in parallel with a radial direction of an imaginary circle centered on a rotational axis; and a progressively varying portion which is placed on an outer side of the parallel portion in the radial direction. A width of the progressively varying portion measured in a circumferential direction is progressively increased toward the outer side in the radial direction.

7 Claims, 14 Drawing Sheets

(51) Int. Cl.
    *F16K 27/04*    (2006.01)
    *F16K 31/04*    (2006.01)
    *F16K 31/53*    (2006.01)
    *F16K 3/08*     (2006.01)

(52) U.S. Cl.
    CPC .......... *F16K 31/041* (2013.01); *F16K 31/535* (2013.01); *F16K 3/08* (2013.01); *F16K 27/047* (2013.01); *Y10T 137/86533* (2015.04)

(56) References Cited

U.S. PATENT DOCUMENTS

| | | | | |
|---|---|---|---|---|
| 5,950,576 | A * | 9/1999 | Busato | F01P 7/16 137/625.46 |
| 6,789,573 | B2 * | 9/2004 | Knapp | F16K 11/0743 137/625.41 |
| 7,549,446 | B2 * | 6/2009 | Yang | F16K 11/0743 137/625.46 |
| 7,779,865 | B2 * | 8/2010 | Shay | F16K 3/04 137/454.6 |
| 9,091,045 | B2 * | 7/2015 | Korb | E03C 1/04 |
| 9,625,041 | B1 * | 4/2017 | Lopez | F16K 31/535 |
| 9,803,759 | B2 * | 10/2017 | Bachofer | F16K 11/0743 |
| 9,874,284 | B2 * | 1/2018 | Bachofer | F16K 11/0746 |
| 10,722,098 | B2 * | 7/2020 | Koepke | F16K 27/0227 |
| 11,143,330 | B2 * | 10/2021 | Yokoe | F16K 11/074 |
| 11,959,553 | B2 * | 4/2024 | Robin | F16K 11/0853 |
| 2019/0301619 | A1 | 10/2019 | Wu et al. | |

* cited by examiner

VALVE DEVICE

CROSS REFERENCE TO RELATED APPLICATIONS

This application is a continuation application of International Patent Application No. PCT/JP2021/033320 filed on Sep. 10, 2021, which designated the U.S. and claims the benefit of priority from Japanese Patent Application No. 2020-167777 filed on Oct. 2, 2020. The entire disclosures of all of the above applications are incorporated herein by reference.

TECHNICAL FIELD

The present disclosure relates to a valve device.

BACKGROUND

Previously, there is proposed a valve device, which is used in a fluid circulation system that circulates fluid. The valve device is used to change a flow path of the fluid or control a flow rate of the fluid.

One such a valve device includes: a flow hole forming portion, which is fixed in an inside of a housing shaped in a tubular form; a rotor, which is rotatably installed in the housing; a drive device, which is configured to rotate the rotor; and a shaft and a coupling member, which couple between the rotor and the drive device. The flow hole forming portion has: two flow holes, which are configured to conduct the fluid therethrough; and a partition which partitions between the two flow holes. The rotor has: a single passage opening, which is configured to conduct the fluid; and a closing portion, which slidably contacts the flow hole forming portion.

When a torque, which is generated by the drive device, is transmitted to the rotor through the shaft and the coupling member, the rotor is rotated about a rotational axis of the shaft. Therefore, one of the two flow holes of the flow hole forming portion is communicated with the passage opening of the rotor, and the other one of the two flow holes is closed by the closing portion of the rotor. Thus, the fluid, which flows in the inside of the housing, flows through the one of the two flow holes of the flow hole forming portion while the flow of the fluid into the other one of the two flow holes is blocked.

SUMMARY

This section provides a general summary of the disclosure, and is not a comprehensive disclosure of its full scope or all of its features.

According to the present disclosure, there is provided a valve device including:
a housing that has a passage configured to conduct fluid;
a flow hole forming portion that is fixed at the passage of the housing and includes:
a plurality of flow holes, each of which is configured to conduct the fluid; and
at least one partition which is placed between corresponding adjacent two of the plurality of flow holes; and
a rotor that is placed in the passage of the housing and is configured to rotate about a rotational axis which is predetermined, wherein the rotor includes:
a passage opening which is configured to communicate with a corresponding predetermined flow hole among the plurality of flow holes of the flow hole forming portion according to a rotation angle of the rotor; and
a closing portion which is configured to close a rest of the plurality of flow holes that is other than the corresponding predetermined flow hole, wherein:
a circle, which is centered on the rotational axis of the rotor and is perpendicular to the rotational axis, is defined as an imaginary circle;
an opening edge of the passage opening of the rotor has a radial section, wherein the radial section faces in a circumferential direction of the imaginary circle and extends along an imaginary line which extends in a radial direction of the imaginary circle; and
the at least one partition of the flow hole forming portion has:
a parallel portion which extends in parallel with the radial direction of the imaginary circle; and
a progressively varying portion which is placed on an outer side of the parallel portion in the radial direction, wherein a width of the progressively varying portion, which is measured in the circumferential direction, is progressively increased toward the outer side in the radial direction.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
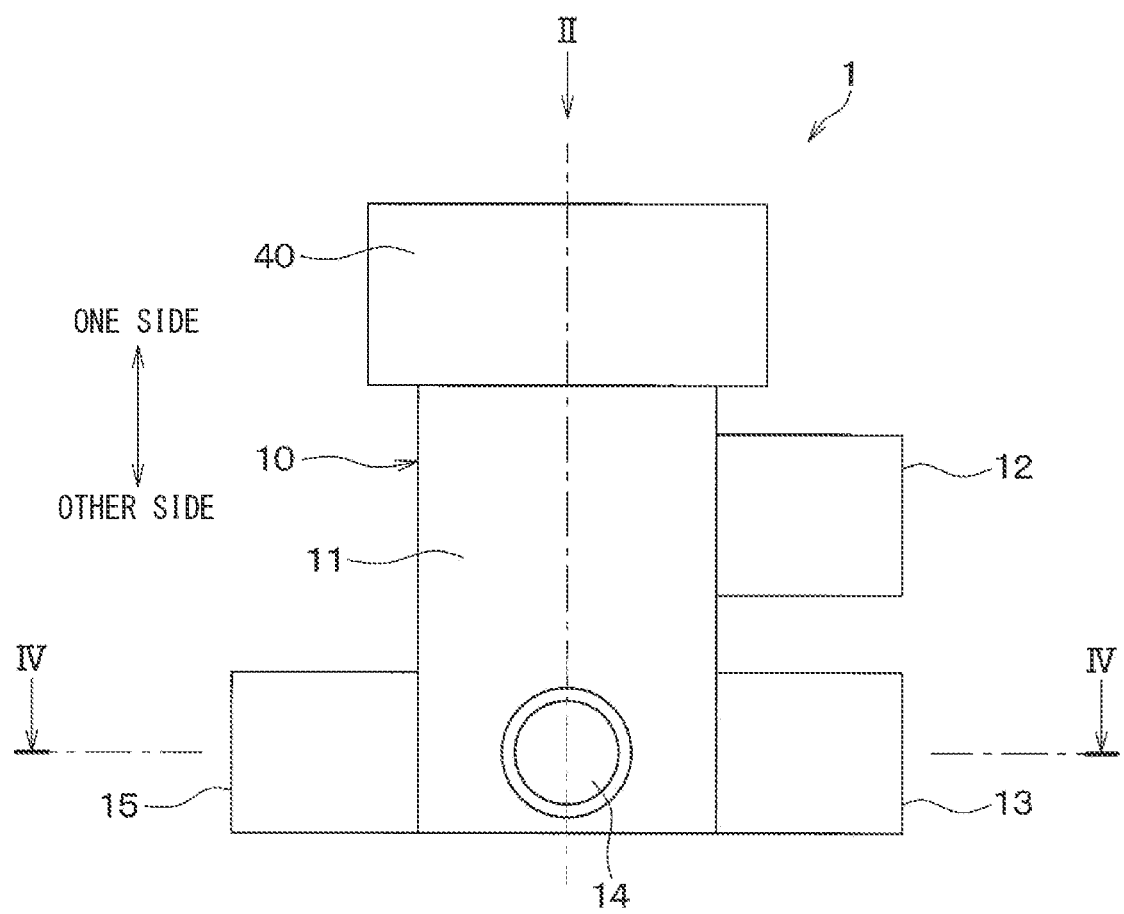
FIG. 1 is a front view schematically showing a valve device of a first embodiment.
Figure 2:
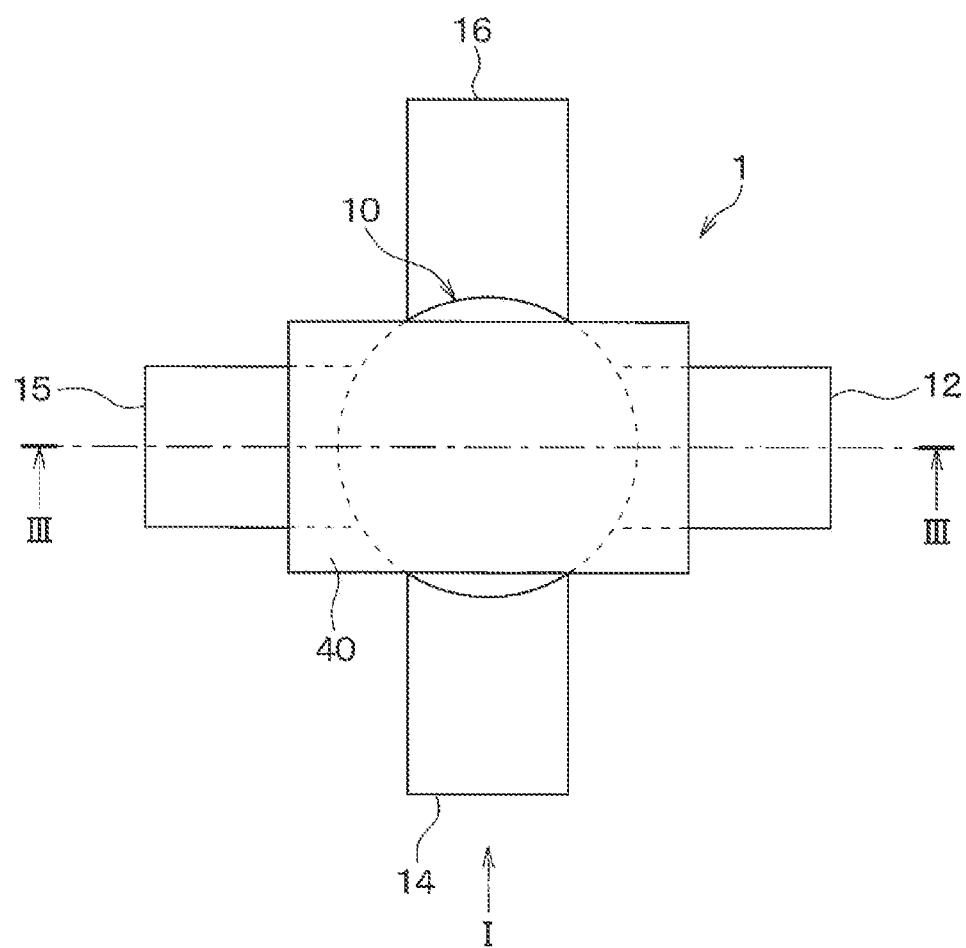
FIG. 2 is a plan view taken in a direction of an arrow II in FIG. 1, schematically showing the valve device.

Previously, there is proposed a valve device, which is used in a fluid circulation system that circulates fluid. The valve device is used to change a flow path of the fluid or control a flow rate of the fluid.

One such a valve device includes: a flow hole forming portion (first valve), which is fixed in an inside of a housing shaped in a tubular form; a rotor (second valve), which is rotatably installed in the housing; a drive device, which is configured to rotate the rotor; and a shaft and a coupling member, which couple between the rotor and the drive device. The flow hole forming portion has: two flow holes, which are configured to conduct the fluid therethrough; and a partition which partitions between the two flow holes. The rotor has: a single passage opening, which is configured to conduct the fluid; and a closing portion, which slidably contacts the flow hole forming portion.

When a torque, which is generated by the drive device, is transmitted to the rotor through the shaft and the coupling member, the rotor is rotated about a rotational axis of the shaft. Therefore, one of the two flow holes of the flow hole forming portion is communicated with the passage opening of the rotor, and the other one of the two flow holes is closed by the closing portion of the rotor. Thus, the fluid, which flows in the inside of the housing, flows through the one of the two flow holes of the flow hole forming portion while the flow of the fluid into the other one of the two flow holes is blocked.

In the valve device described above, a small gap for assembly is provided at each of: a meshing part between gears of the gear mechanism in the drive device; an engaging part between an output gear of the drive device and the shaft; an engaging part between the shaft and the coupling member; and an engaging part between the coupling member and the rotor. Therefore, in a case of rotating the rotor in a forward rotation direction and a reverse rotation direction by transmitting the torque from the drive device to the rotor, a rotation angle of the rotor may possibly vary relative to a rotation angle of the drive device. Therefore, at the time of flowing the fluid through one of the flow holes of the flow hole forming portion by rotating the rotor to a predetermined position while blocking the other one of the flow holes, the fluid may unintentionally leak into the other one of the flow holes due to the variation in the stop position of the rotor.

With respect to this disadvantage, it is conceivable to increase a width of the partition of the flow hole forming portion to limit the leakage of the fluid into the other flow hole even in the case where the variation in the stop position of the rotor occurs. However, in this configuration, a passage cross-sectional area of the respective flow holes of the flow hole forming portion becomes small, and thereby a pressure loss of the fluid passing through the opened flow hole among the flow holes is disadvantageously increased.

According to one aspect of the present disclosure, a valve device includes a housing, a flow hole forming portion, a rotor and a drive device. The housing has a passage configured to conduct fluid. The flow hole forming portion is fixed at the passage of the housing and includes: a plurality of flow holes, each of which is configured to conduct the fluid; and at least one partition (or a plurality of partitions) which is placed between corresponding adjacent two of the plurality of flow holes. The rotor is placed in the passage of the housing and is configured to rotate about a rotational axis which is predetermined. The rotor includes: a passage opening which is configured to communicate with a corresponding predetermined flow hole among the plurality of flow holes of the flow hole forming portion according to a rotation angle of the rotor; and a closing portion which is configured to close a rest of the plurality of flow holes that is other than the corresponding predetermined flow hole. The drive device is configured to output a torque which rotates the rotor.

Here, a circle, which is centered on the rotational axis of the rotor and is perpendicular to the rotational axis, is defined as an imaginary circle. An opening edge of the passage opening of the rotor has a radial section. The radial section faces in a circumferential direction of the imaginary circle and extends along an imaginary line which extends in a radial direction of the imaginary circle.

The at least one partition of the flow hole forming portion has: a parallel portion which extends in parallel with the radial direction of the imaginary circle; and a progressively varying portion which is placed on an outer side of the parallel portion in the radial direction. A width of the progressively varying portion, which is measured in the circumferential direction, is progressively increased toward the outer side in the radial direction.

With the above configuration, the valve device can communicate the corresponding predetermined flow hole among the plurality of flow holes of the flow hole forming portion to the passage opening of the rotor by rotating the rotor by the drive device while closing the rest of the plurality of flow holes that is other than the corresponding predetermined flow hole. At this time, since the at least one partition of the flow hole forming portion has the progressively varying portion, it is possible to limit the communication of the passage opening with the unintended flow hole, which is supposed to be closed. Therefore, in the valve device, it is possible that the fluid flows into the intended flow hole and does not flow into the unintended flow hole which is supposed to be closed.

In contrast, in this valve device, since the at least one partition has the parallel portion and the progressively varying portion, the passage cross-sectional area of the respective flow holes of the flow hole forming portion can be increased in comparison to the configuration, in which the partition is formed only by the parallel portion which has the large width. Thus, this valve device can improve the degree of sealing of the unintended one of the plurality of flow holes, which is not intended to conduct fluid, while limiting the increase in the pressure loss of the fluid that flows through the opened one of the plurality of flow holes.

Hereinafter, embodiments of the present disclosure will be described with reference to the drawings. In each of the following embodiments, portions, which are the same or equivalent to each other, will be indicated by the same reference signs.

First Embodiment

A valve device of a first embodiment is used in a fluid circulation system installed on, for example, an electric vehicle or a hybrid vehicle. The fluid circulation system is a system that circulates coolant (serving as fluid) through a drive power source for driving the vehicle and a heater core for air conditioning of a vehicle cabin. For example, LLC (Long Life Coolant) containing ethylene glycol is used as the coolant. The valve device is configured to change a flow path of the coolant flowing in the system or adjust a flow rate of the coolant.

First of all, a structure of the valve device of the present embodiment will be described.

As shown in FIGS. 1 to 4, the valve device 1 of the present embodiment includes a housing 10, a flow hole forming portion (also referred to as a stator) 20, a rotor 30 and a drive device 40. In the present embodiment, there is described an example, in which the valve device 1 is formed as a five-way valve.

The housing 10 forms an outer shell of the valve device 1 and has a passage configured to conduct the fluid at an inside of the housing 10. Specifically, the housing 10 includes a housing main body 11, a fluid inlet 12 and four fluid outlets 13-16. The housing main body 11 is shaped in a bottomed tubular form. The fluid inlet 12 and the fluid outlets 13-16 are communicated with an inside of the housing main body 11. The fluid inlet 12 is located at a portion of the housing main body 11, which is located on one side in an axial direction of the housing main body 11, and the fluid outlets 13-16 are located at another portion of the housing main body 11 located on the other side in the axial direction. In the following description, the fluid outlets 13-16 will be referred to as a first fluid outlet 13, a second fluid outlet 14, a third fluid outlet 15 and a fourth fluid outlet 16, respectively. The fluid outlets 13-16 are arranged one after another in a circumferential direction of the housing main body 11.

Figure 3:
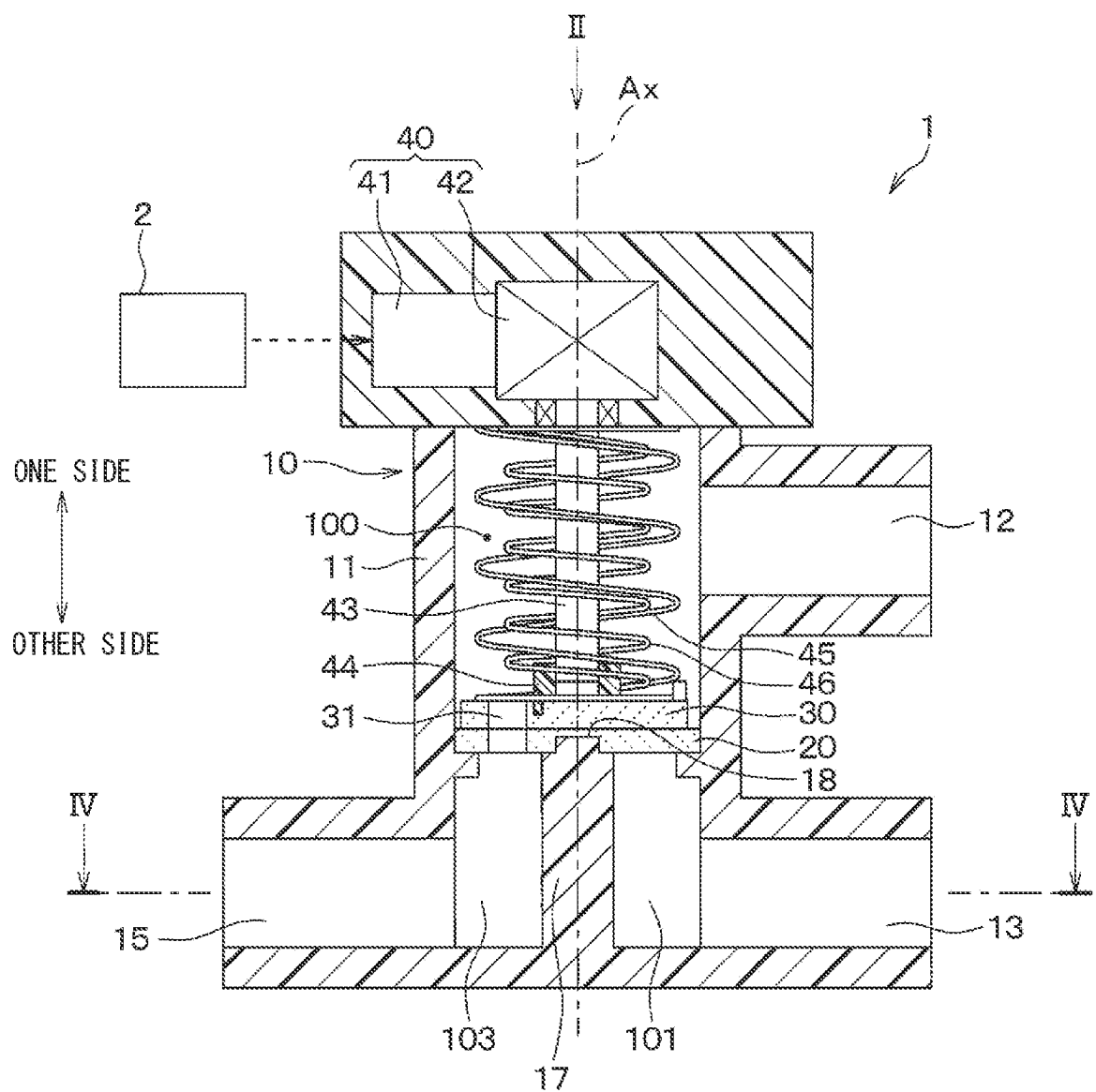
FIG. 3 is a cross-sectional view taken along line III-III in FIG. 2, schematically showing a cross-section of the valve device.
Figure 5:
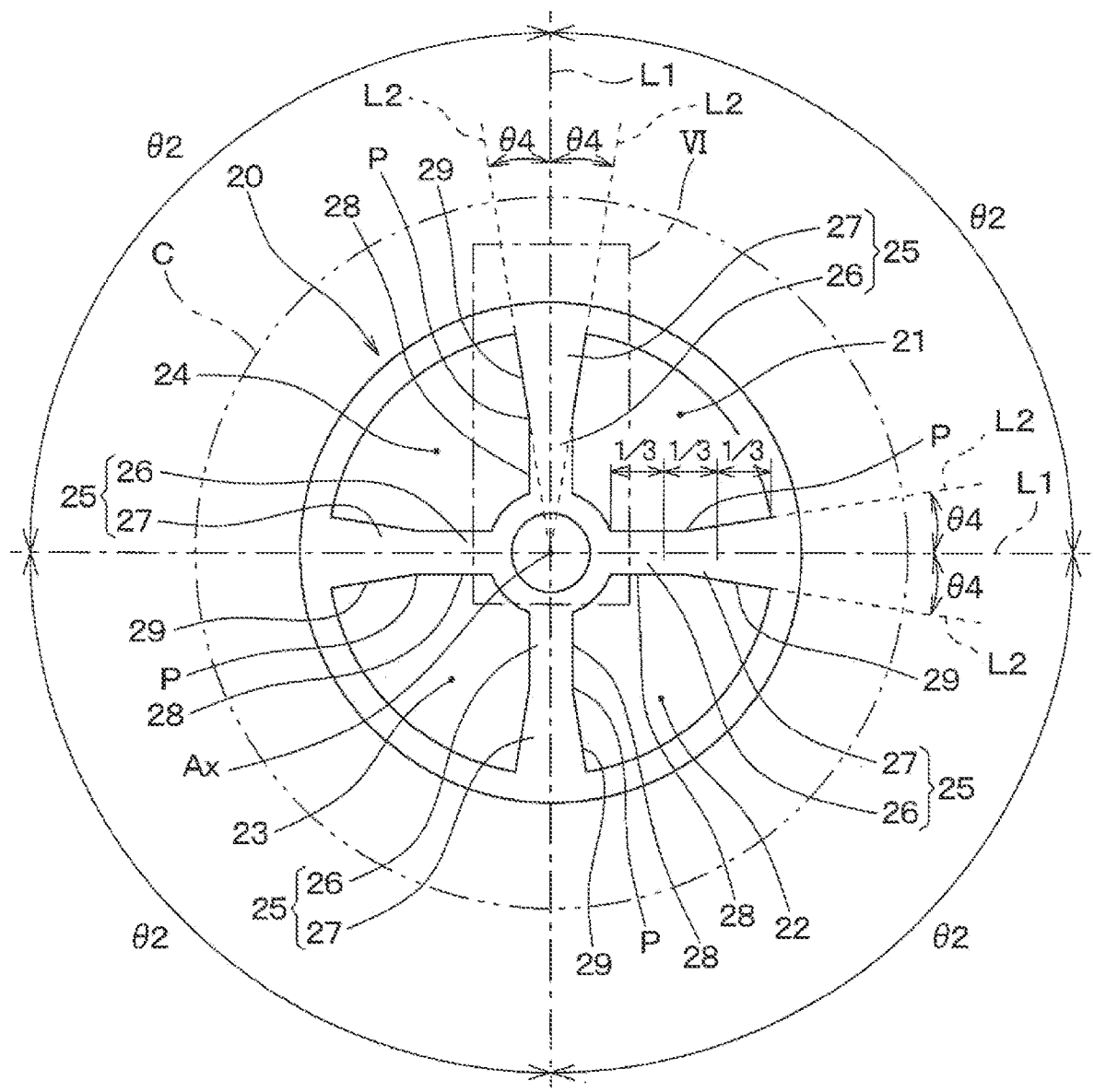
FIG. 5 is a plan view showing only a flow hole forming portion of the valve device of the first embodiment.

As shown in FIG. 3, the flow hole forming portion 20 is fixed at the passage in the housing 10. The flow hole forming portion 20 is installed such that the flow hole forming portion 20 does not make a relative rotation around the axis at the passage of the housing 10. As shown in FIG. 5, the flow hole forming portion 20 of the present embodiment is shaped in a form of a circular disk. The flow hole forming portion 20 includes: four flow holes 21-24, each of which extends through the flow hole forming portion 20 in a plate thickness direction of the flow hole forming portion 20; and four partitions 25, each of which is provided between corresponding adjacent two of the flow holes 21-24. Each of the flow holes 21-24 is configured to conduct the fluid therethrough. The four flow holes 21-24 and the four partitions 25 are alternately arranged in the circumferential direction of the flow hole forming portion 20 along an entire circumferential extent of the flow hole forming portion 20. Each of the flow holes 21-24 is shaped generally in a form of a sector. In the following description, the flow holes 21-24 will be referred to as a first flow hole 21, a second flow hole 22, a third flow hole 23 and a fourth flow hole 24, respectively. A shape of each of the partitions 25 of the flow hole forming portion 20 will be described later.

Figure 7:
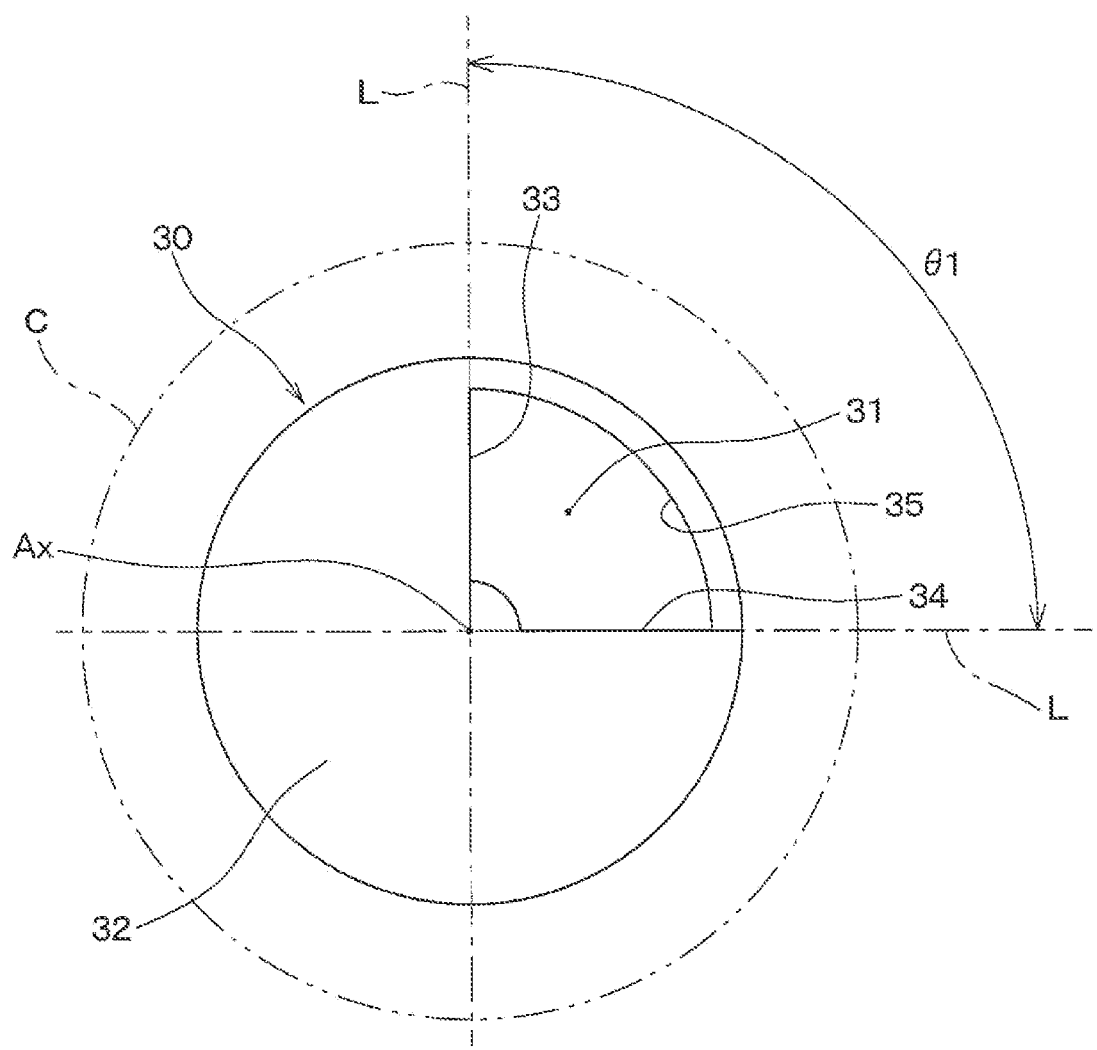
FIG. 7 is a plan view showing only a rotor of the valve device of the first embodiment.

As shown in FIG. 3, the rotor 30 is installed at the passage of the housing 10 such that the rotor 30 is rotatable about a rotational axis Ax which is predetermined. The rotor 30 makes surface-to-surface contact with a surface of the flow hole forming portion 20 while this surface of the flow hole forming portion 20 is located on the one side in the plate thickness direction. As shown in FIG. 7, the rotor 30 of the present embodiment is shaped in a form of a circular disk. The rotor 30 includes: a passage opening 31, which extends through the rotor 30 in a plate thickness direction of the rotor 30; and a closing portion 32 which is a remaining portion of the rotor 30 that is other than the passage opening 31. The passage opening 31 is shaped generally in a form of a sector and can conduct the fluid therethrough. When the rotor 30 is rotated about the rotational axis Ax and is stopped at a corresponding predetermined position, the passage opening 31 of the rotor 30 is communicated with a corresponding one of the flow holes 21-24 of the flow hole forming portion 20. At this time, the closing portion 32 of the rotor 30 closes the remaining three flow holes among the flow holes 21-24 of the flow hole forming portion 20.

Here, a circle, which is centered on the rotational axis Ax of the rotor 30 and is perpendicular to the rotational axis Ax, is defined as an imaginary circle C. In FIG. 7, the imaginary circle C is indicated by a dot-dot-dash line. In the following description, a line, which extends in a radial direction of the imaginary circle C, will be referred to as an imaginary line L.

An opening edge of the passage opening 31 of the rotor 30 has two radial sections 33, 34 which face each other in the circumferential direction of the imaginary circle C. Each of the radial sections 33, 34 linearly extends along the corresponding imaginary line L which extends in the radial direction of the imaginary circle C. This expression of the radial sections 33, 34 includes a state where each of the radial sections 33, 34, which respectively face in the circumferential direction of the imaginary circle C at the opening edge of the passage opening 31, slightly deviates from the corresponding imaginary line L which extends in the radial direction of the imaginary circle C, due to, for example, a manufacturing tolerance as long as each of the radial sections 33, 34 substantially coincide with the corresponding imaginary line L. A circumferential section 35 of the opening edge of the passage opening 31, which face inward in the radial direction of the imaginary circle C, is shaped in a form of an arc. A size of the passage opening 31 of the rotor 30 is set to be slightly larger than each of the flow holes 21-24 of the flow hole forming portion 20 shown in FIG. 5. Specifically, an angle θ1, which is defined between the radial sections 33, 34 facing each other in the circumferential direction of the imaginary circle C at the opening edge of the passage opening 31, coincides with an angle θ2 defined between center lines of circumferentially adjacent two of the partitions 25 of the flow hole forming portion 20. In this description, the angle, which is defined between two lines, refers to an interior angle of these two lines.

A shape of each of the four partitions 25 of the flow hole forming portion 20 will be described with reference to FIGS. 5 and 6.

Even in FIG. 5, like in FIG. 7, the imaginary circle C, which is centered on the rotational axis Ax of the rotor 30 and is perpendicular to the rotational axis Ax, is indicated by the dot-dot-dash line. In a state where the flow hole forming portion 20 and the rotor 30 are installed in the housing 10, a central axis of the flow hole forming portion 20 and the rotational axis Ax of the rotor 30 coincide with each other. Therefore, the center of the imaginary circle C and the central axis of the flow hole forming portion 20 coincide with each other in FIG. 5.

The four partitions 25 of the flow hole forming portion 20 respectively extend in the radial direction of the imaginary circle C. The four partitions 25 are arranged at 90° intervals in the circumferential direction of the imaginary circle C. Specifically, in FIG. 5, the angle θ2, which is defined between the center lines of each circumferentially adjacent two of the partitions 25 of the flow hole forming portion 20, is set to be 90°. However, the arrangement of the partitions 25 is not limited to the arrangement shown in FIG. 5 and may be set to any arrangement according to, for example, a required flow rate characteristic of the flow holes.

In the following description, a line, which coincides with the center line of the corresponding partition 25 and extends in the radial direction of the imaginary circle C, will be referred to as a primary imaginary line L1. Furthermore, a line, which radially extends and is tilted by a predetermined angle from the primary imaginary line L1 toward the inside of the corresponding closest one of the flow holes 21-24, will be referred to as a secondary imaginary line L2.

The four partitions 25 of the flow hole forming portion 20 respectively have an identical shape. As shown in FIGS. 5 and 6, each of the partitions 25 has a parallel portion 26 and a progressively varying portion 27. The parallel portion 26 extends in parallel with the primary imaginary line L1. The parallel portion 26 extends in the radial direction of the imaginary circle C such that a width of the parallel portion 26 is constant along an entire radial extent of the parallel portion 26. The progressively varying portion 27 is placed on an outer side of the parallel portion 26 in the radial direction. A width of the progressively varying portion 27, which is measured in the circumferential direction, is progressively increased toward the outer side in the radial direction.

Two peripheral edges of the parallel portion 26, which are circumferentially opposite to each other, respectively have a first edge section 28, which faces in the circumferential direction of the imaginary circle C. The first edge section 28 is spaced by a predetermined distance from the primary imaginary line L1 toward the inside of the closest one of the flow holes 21-24, which is closest to the peripheral edge of the parallel portion 26, and the first edge section 28 extends in parallel with the primary imaginary line L1. This expression of the first edge section 28 includes a state where the first edge section 28 slightly deviates from the primary imaginary line L1 due to, for example, a manufacturing tolerance as long as the first edge section 28 is substantially in parallel with the primary imaginary line L1.

Two peripheral edges of the progressively varying portion 27, which are circumferentially opposite to each other, respectively have a second edge section 29, which faces in the circumferential direction of the imaginary circle C. The second edge section 29 extends along the secondary imaginary line L2 described above. This expression of the second edge section 29 includes a state where the second edge section 29 slightly deviates from the secondary imaginary line L2 due to, for example, a manufacturing tolerance as long as the second edge section 29 is substantially in parallel with the secondary imaginary line L2.

Figure 6:
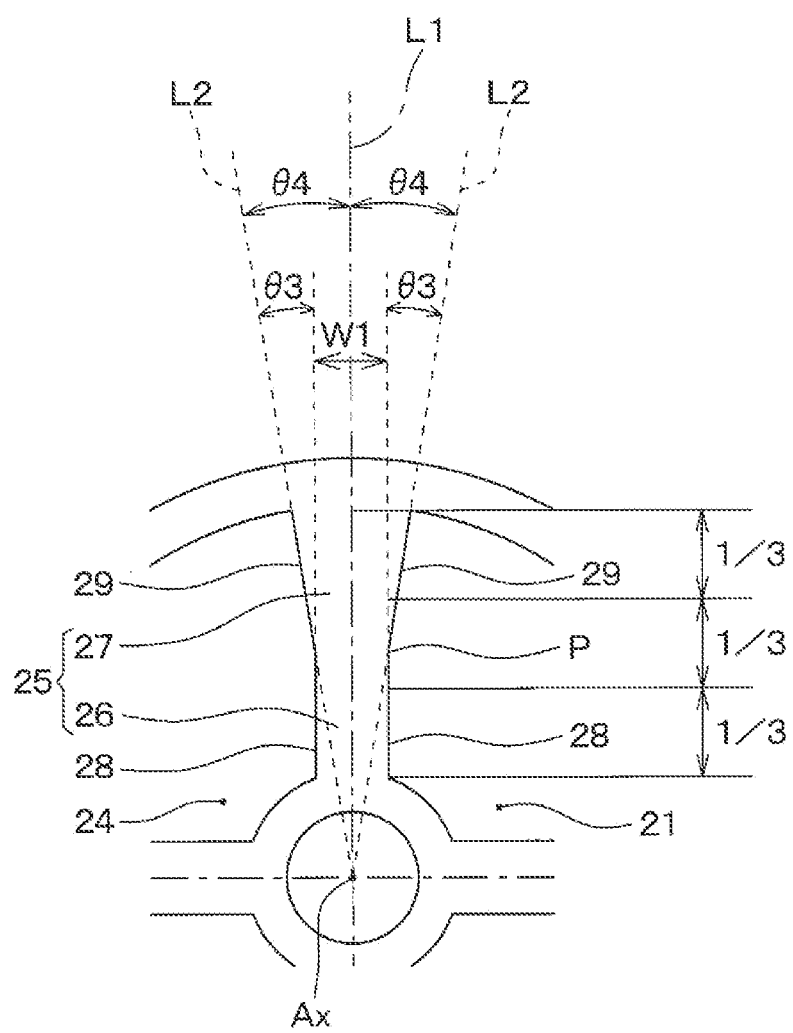
FIG. 6 is an enlarged view of a portion VI in FIG. 5.

As shown in FIG. 6, an exterior angle θ3, which is defined between the first edge section 28 and the second edge section 29 (more specifically, between an imaginary extension line of the first edge section 28 and an imaginary extension line of the second edge section 29), is the same as an angle θ4, which is defined between the primary imaginary line L1 and the secondary imaginary line L2. The exterior angle θ3, which is defined between the first edge section 28 and the second edge section 29 (i.e., the angle θ4 defined between the primary imaginary line L1 and the secondary imaginary line L2), can be arbitrarily set according to the amount of variation in the stop position of the rotor 30, which is assumed be generated at the time of driving the rotor 30 in a forward rotation direction and a backward rotation direction. In the present embodiment, the exterior angle θ3, which is defined between the first edge section 28 and the second edge section 29 (i.e., the angle θ4 defined between the primary imaginary line L1 and the secondary imaginary line L2), is set in, for example, a range of 5° to 10°.

A location of a connection point P between the first edge section 28 and the second edge section 29 can be arbitrarily set based on the relationship between the exterior angle θ3 defined between the first edge section 28 and the second edge section 29 and the width W1 of the parallel portion 26. In the present embodiment, when a radial length of the partition 25 is divided into three equal parts, the connection point P between the first edge section 28 and the second edge section 29 is located in a center part among the three equal parts.

Figure 4:
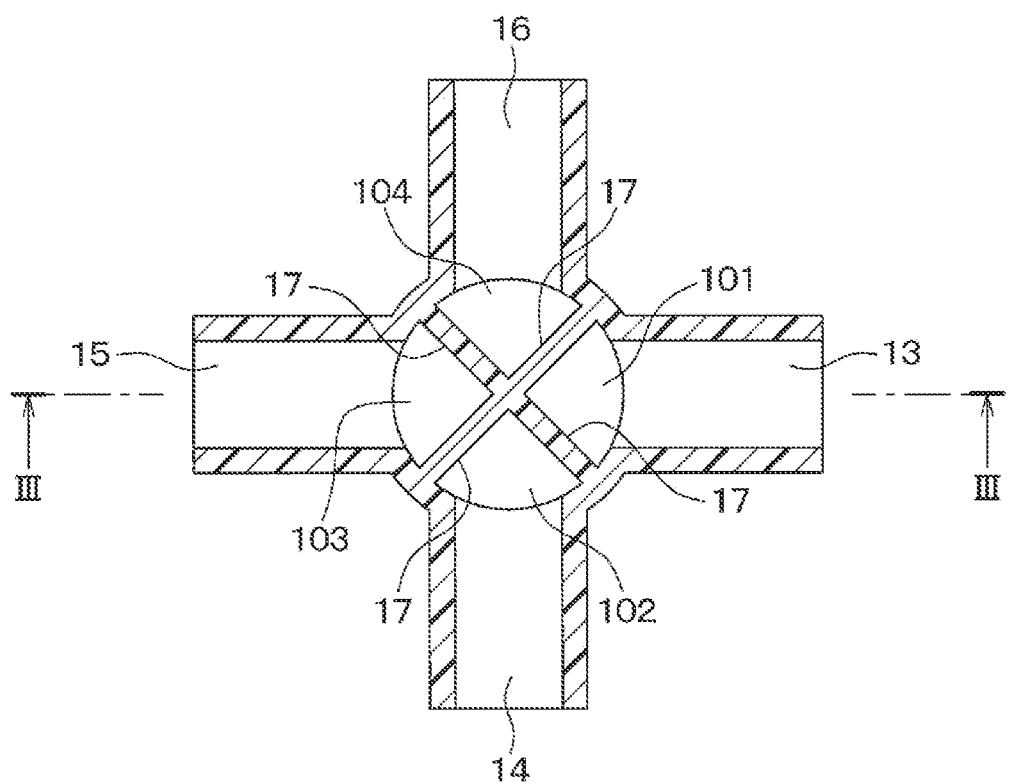
FIG. 4 is a cross-sectional view taken along line IV-IV in FIG. 1 or FIG. 3, schematically showing another cross-section of the valve device.

As shown in FIGS. 3 and 4, a plurality of chambers are formed at the inside of the housing main body 11. Specifically, an inlet communication chamber 100, which is communicated with the fluid inlet 12, and first to fourth communication chambers 101-104, which are respectively communicated with the first to fourth fluid outlets 13-16, are formed. The inlet communication chamber 100 is located on the one side of the rotor 30 at which the fluid inlet 12 is placed. The first to fourth communication chambers 101-104 are located on the other side of the flow hole forming portion 20 at which the first to fourth fluid outlets 13-16 are placed. The first to fourth communication chambers 101-104 are partitioned by four partition walls 17 provided in the inside of the housing 10. As shown in FIG. 4, a wall thickness of each of the four partition walls 17 does not vary in both of the radial direction and the axial direction. Specifically, the wall thickness of each of the partition walls 17 is constant in the radial direction and the axial direction. Thereby, generation of voids and deterioration of dimensional accuracy during injection molding can be limited. The four partition walls 17 are respectively placed at four locations which correspond to the locations of the four partitions 25 of the flow hole forming portion 20. An end portion 18 of each of the four partition walls 17 is fixed in a state where an orientation of the end portion 18 corresponds to a corresponding one of the four partitions 25 of the flow hole forming portion 20. Therefore, the first to fourth communication chambers 101-104 are respectively communicated with the first to fourth flow holes 21-24 of the flow hole forming portion 20. The flow hole forming portion 20 shown in FIG. 5 is in a state where the flow hole forming portion 20 is rotated by 45° in a counterclockwise direction relative to the housing 10 shown in FIG. 4.

As shown in FIG. 3, the drive device 40 is provided to one end portion of the housing 10. The drive device 40 include: an electric motor 41 which serves as a drive power source; and a gear mechanism 42 which transmits a torque outputted from the electric motor 41 to the shaft 43. The electric motor 41 is rotated according to a control signal outputted from an electronic control device 2. The gear mechanism 42 includes a plurality of gears meshed with each other. The electronic control device 2, which controls an operation of the electric motor 41, is a computer that includes, for example, a semiconductor memory and a processor. The memory is a non-transitory tangible storage medium. The electronic control device 2 executes a computer program stored in the memory and also executes various control processes according to the computer program.

The drive device 40 and the rotor 30 are coupled with each other through the shaft 43 and a coupling member 44. One end portion of the shaft 43 is engaged with an output gear (not shown) of the gear mechanism 42 of the drive device 40. The other end portion of the shaft 43 is engaged with the coupling member 44. The coupling member 44 and the rotor 30 are engaged with each other. Thereby, when the torque, which is generated by the drive device 40, is transmitted to the rotor 30 through the shaft 43 and the coupling member 44, the rotor 30 is rotated about the rotational axis Ax which is predetermined. The shaft 43, the coupling member 44 and the rotor 30 are rotated about the common rotational axis Ax.

A torsion spring (serving as a first urging member) 45 and a compression spring (serving as a second urging member) 46 are provided around the shaft 43.

The torsion spring 45 is a torsion coil spring which urges the rotor 30 relative to the housing 10 toward one side in the circumferential direction of the imaginary circle C. One end portion of the torsion spring 45 is anchored to the housing 10 or a member (e.g., the drive device 40) fixed to the housing 10, and the other end portion of the torsion spring 45 is anchored to the rotor 30 or a member (e.g., the coupling member 44) fixed to the rotor 30. In the present embodiment, the first urging member is formed by the single torsion spring 45. However, the present disclosure is not limited to this, and the first urging member may be formed by a plurality of torsion springs.

The drive device 40 and the rotor 30 are coupled with each other through the shaft 43 and the coupling member 44. Therefore, in the drive device 40, a small gap for assembly is provided at each of: the meshing part between the gears of the gear mechanism 42; the engaging part between the output gear of the drive device 40 and the shaft 43; the engaging part between the shaft 43 and the coupling member 44; and the engaging part between the coupling member 44 and the rotor 30. By applying the urging force of the torsion spring 45 to the engaging part or the meshing part between the members for transmitting the torque from the drive device 40 to the rotor 30, the rotor 30 is rotated in a state where the members, which form the engaging part or the meshing part, are always in contact with each other.

The compression spring 46 is a compression coil spring which urges the rotor 30 toward the flow hole forming portion 20. One end portion of the compression spring 46 is anchored to the housing 10 or the member (e.g., the drive device 40 or the shaft 43) fixed to the housing 10, and the other end portion of the compression spring 46 is anchored to the rotor 30 or the member (e.g., the coupling member 44) fixed to the rotor 30. Due to the urging force of the compression spring 46, the rotor 30 and the flow hole forming portion 20 slide relative to each other always in the state where the rotor 30 and the flow hole forming portion 20 contact with each other. Next, the operation of the valve device 1 will be described.

As shown in FIGS. 8 to 11, an operation mode of the valve device 1 of the present embodiment can be changed among mainly four operation modes. In the following description, as indicated by a double-sided arrow in each of FIGS. 8 to 13, in a case where the rotor 30 is viewed from the drive device 40 side, the clockwise direction will be referred to as a forward rotation direction, and the counterclockwise direction will be referred to as the reverse rotation direction. In FIGS. 8 to 13, in order to make the drawings easier to see, the closing portion 32 of the rotor 30 is indicated by a dot hatching, although the view of the closing portion 32 is not the cross-section.

Figure 8:
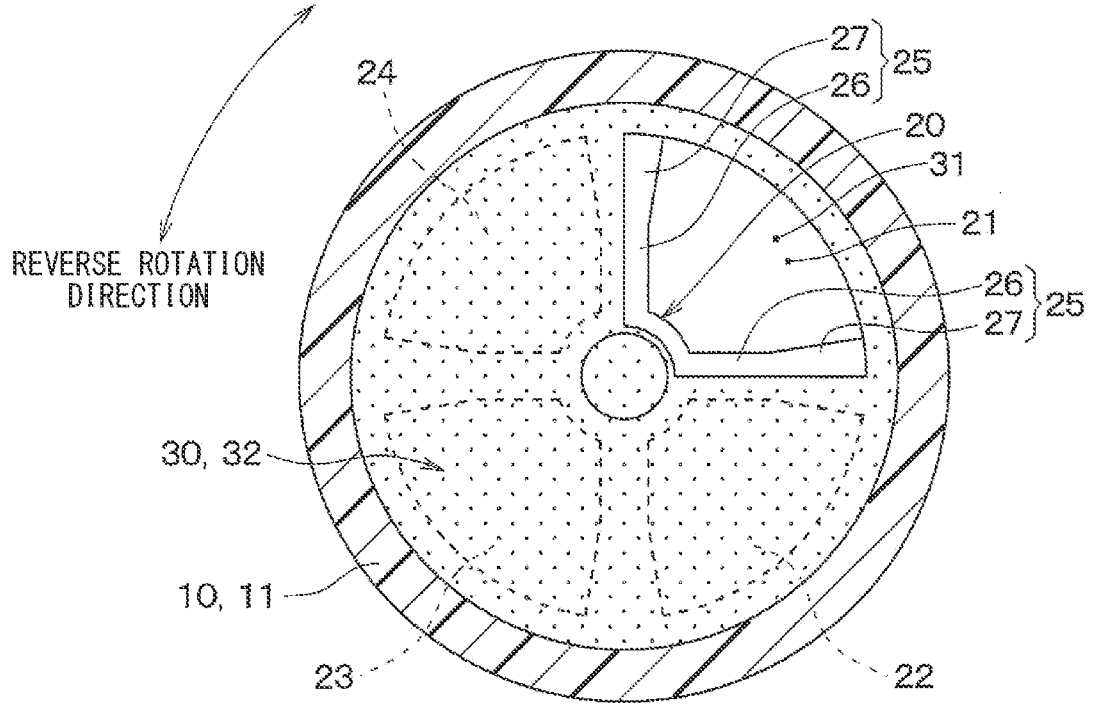
FIG. 8 is a diagram showing a first operation mode of the valve device of the first embodiment.

First of all, as shown in FIG. 8, in the first operation mode, the passage opening 31 of the rotor 30 and the first flow hole 21 of the flow hole forming portion 20 are communicated with each other. Therefore, the coolant, which flows from the fluid inlet 12 into the inlet communication chamber 100 of the housing 10, flows through the passage opening 31 of the rotor 30 and the first flow hole 21 of the flow hole forming portion 20 and then flows out from the first fluid outlet 13 through the first communication chamber 101.

Figure 9:
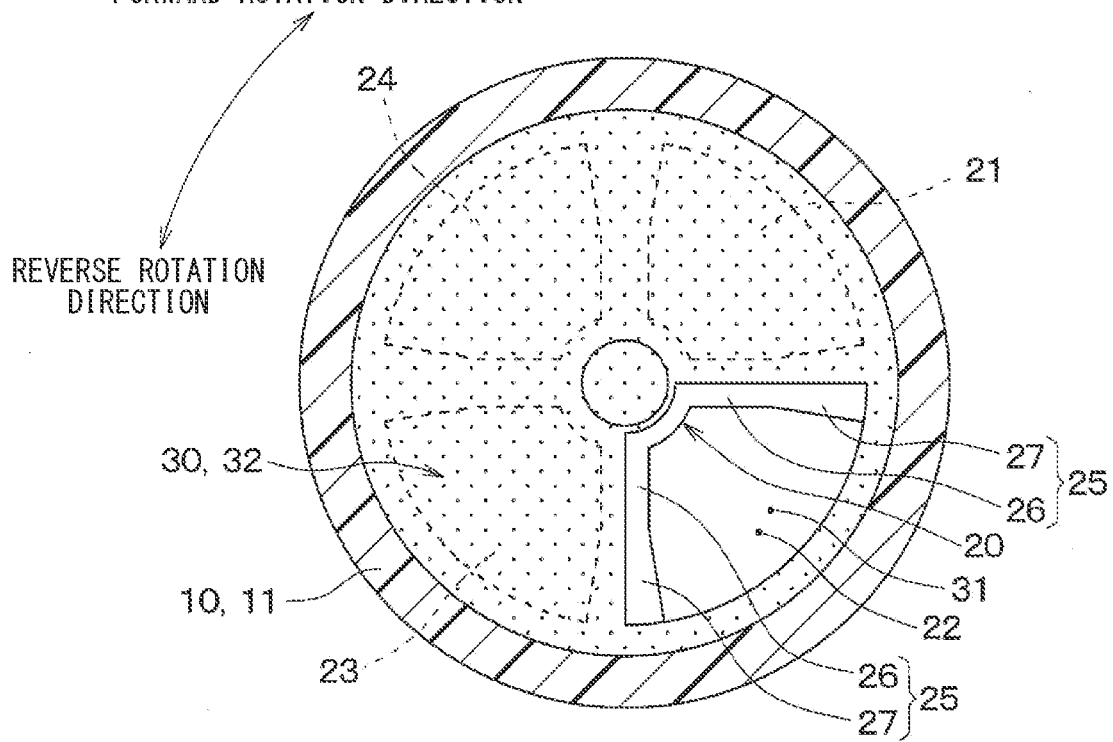
FIG. 9 is a diagram showing a second operation mode of the valve device of the first embodiment.

Next, as shown in FIG. 9, in the second operation mode, the rotor 30 is rotated from the position of the first operation mode by a predetermined angle (e.g., 90°) in the forward rotation direction, so that the passage opening 31 of the rotor 30 and the second flow hole 22 of the flow hole forming portion 20 are communicated with each other. Therefore, the coolant, which flows from the fluid inlet 12 into the inlet communication chamber 100 of the housing 10, flows through the passage opening 31 of the rotor 30 and the second flow hole 22 of the flow hole forming portion 20 and then flows out from the second fluid outlet 14 through the second communication chamber 102.

Figure 10:
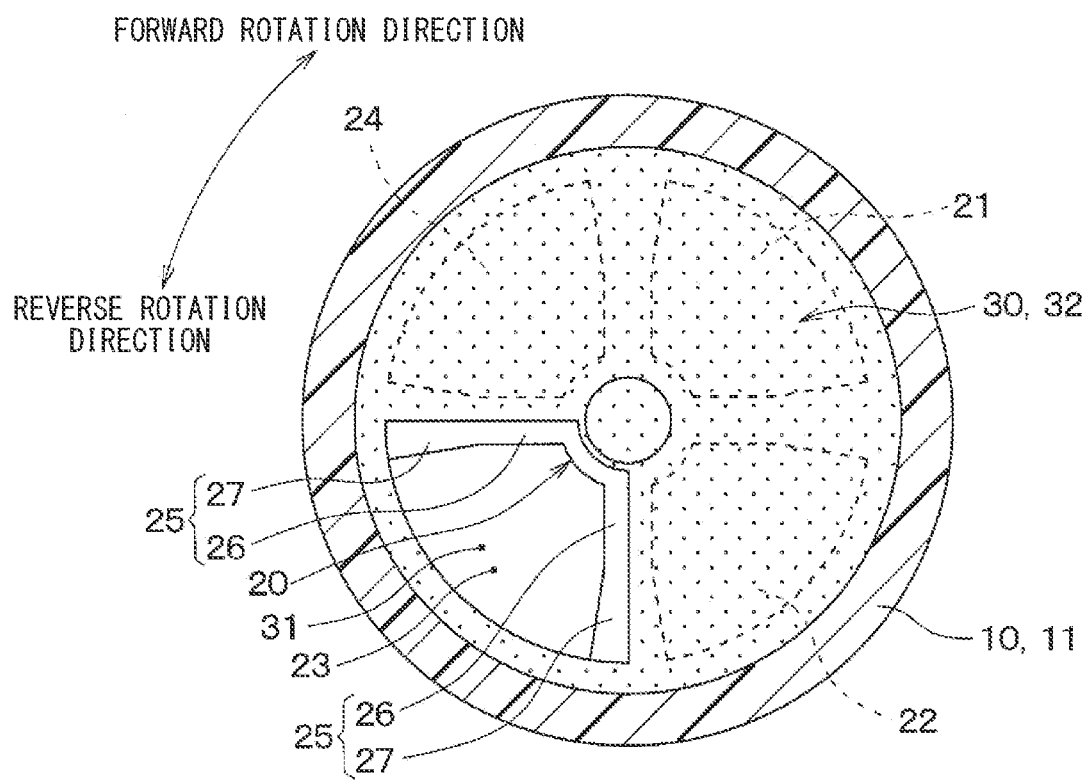
FIG. 10 is a diagram showing a third operation mode of the valve device of the first embodiment.

Next, as shown in FIG. 10, in the third operation mode, the rotor 30 is rotated from the position of the second operation mode by the predetermined angle (e.g., 90°) in the forward rotation direction, so that the passage opening 31 of the rotor 30 and the third flow hole 23 of the flow hole forming portion 20 are communicated with each other. Therefore, the coolant, which flows from the fluid inlet 12 into the inlet communication chamber 100 of the housing 10, flows through the passage opening 31 of the rotor 30 and the third flow hole 23 of the flow hole forming portion 20 and then flows out from the third fluid outlet 15 through the third communication chamber 103.

Figure 11:
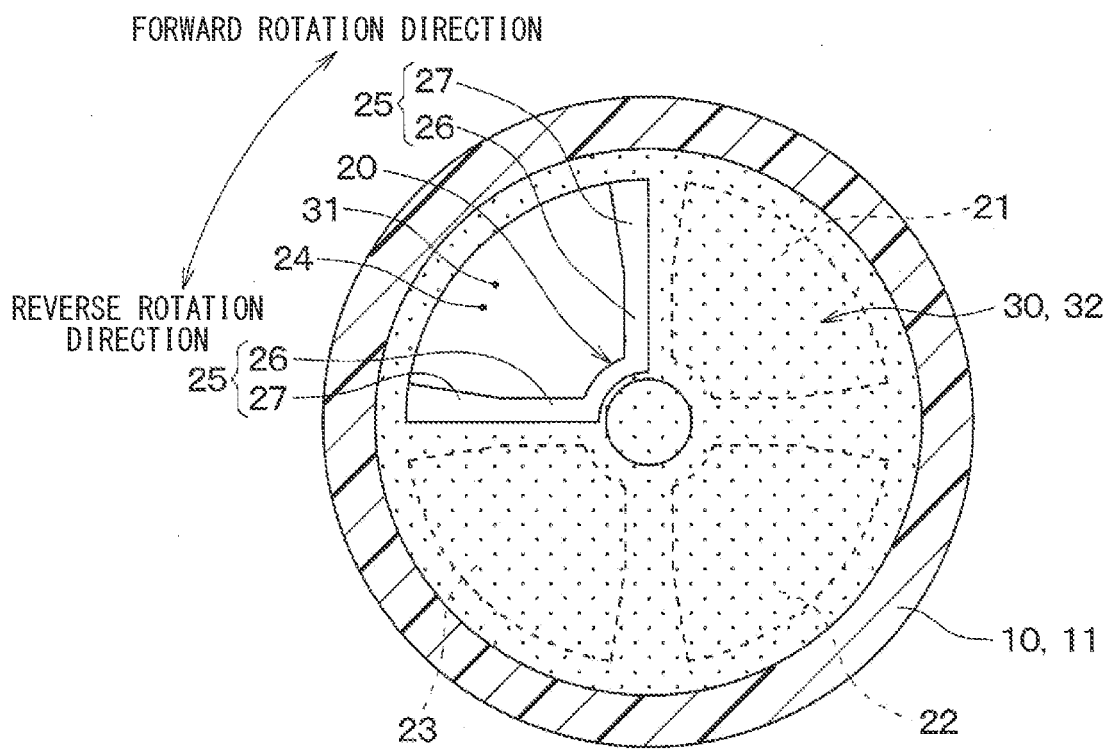
FIG. 11 is a diagram showing a fourth operation mode of the valve device of the first embodiment.

Furthermore, as shown in FIG. 11, in the fourth operation mode, the rotor 30 is rotated from the position of the third operation mode by the predetermined angle (e.g., 90°) in the forward rotation direction, so that the passage opening 31 of the rotor 30 and the fourth flow hole 24 of the flow hole forming portion 20 are communicated with each other. Therefore, the coolant, which flows from the fluid inlet 12 into the inlet communication chamber 100 of the housing 10, flows through the passage opening 31 of the rotor 30 and the fourth flow hole 24 of the flow hole forming portion 20 and then flows out from the fourth fluid outlet 16 through the fourth communication chamber 104.

As discussed above, the operation mode of the valve device 1 of the present embodiment can be changed among the first to fourth operation modes. In the above description, the operation mode of the valve device 1 is changed among the first to fourth operation modes by rotating the rotor 30 in the forward rotation direction. However, the present disclosure is not limited to this. That is, the operation mode of the valve device 1 may be changed among the first to fourth operation modes by rotating the rotor 30 in the reverse rotation direction.

Here, at the time of changing the operation mode of the valve device 1 among the first to fourth operation modes, a variation in the rotation angle of the rotor 30 relative to the rotation angle of the drive device 40 may possibly occur. This variation may be caused by, for example, the presence of a small gap provided for assembly at the engaging parts of the members (i.e., the gear mechanism 42, the shaft 43 and the coupling member 44) which transmit the torque from the drive device 40 to the rotor 30. Alternatively, the variation may be caused by presence of a small gap for assembly between the housing 10 and the flow hole forming portion 20. Further alternatively, the variation may be caused by a variation in the rotation angle of the electric motor 41, or a manufacturing tolerance of the respective members.

In the valve device 1 of the present embodiment, in response to the occurrence of the variation in the rotation angle of the rotor 30 relative to the rotation angle of the drive device 40, a degree of sealing of the unintended flow hole, which is not intended to conduct the fluid, can be improved, and an increase in the pressure loss of the fluid, which flows through the opened flow hole among the flow holes 21-24, can be limited.

Figure 12:
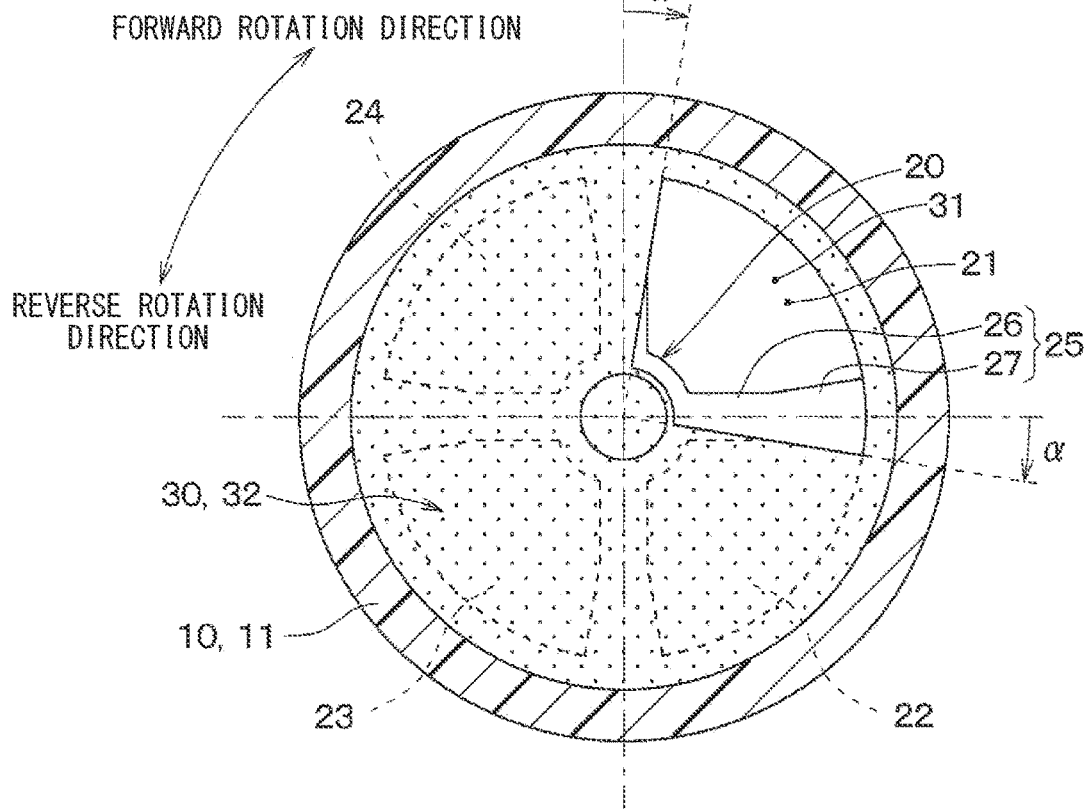
FIG. 12 is a diagram showing a state where a stop position of the rotor is deviated in the first operation mode.

FIG. 12 indicates a state where the rotor 30 is stopped at a position, which is deviated by a predetermined angle in the forward rotation direction from a normal stop position of the rotor 30, at the time when the valve device 1 executes the first operation mode. In FIG. 12, the amount of positional deviation of the rotor 30 in the forward rotation direction relative to the normal stop position of the rotor 30 is indicated by an angle α. Even in this state, since the valve device 1 of the present embodiment has the progressively varying portion 27 at the part of the respective partitions 25 of the flow hole forming portion 20, it is possible to limit an unintended flow of the coolant into the second flow hole 22.

Figure 13:
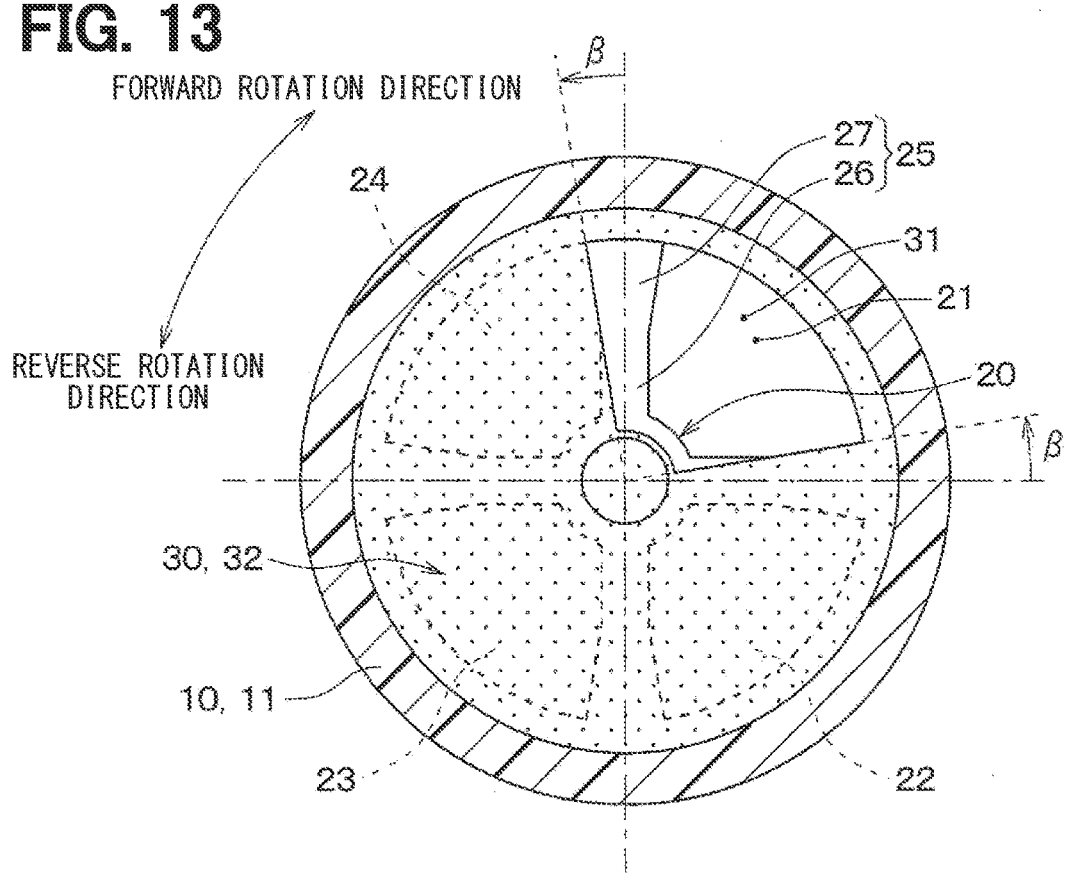
FIG. 13 is a diagram showing a state where the stop position of the rotor is deviated in the first operation mode.

Furthermore, FIG. 13 indicates a state where the rotor 30 is stopped at a position, which is deviated by a predetermined angle in the reverse rotation direction from the normal stop position of the rotor 30, at the time when the valve device 1 executes the first operation mode. In FIG. 13, the amount of positional deviation of the rotor 30 in the reverse rotation direction relative to the normal stop position of the rotor 30 is indicated by an angle β. Even in this state, since the valve device 1 of the present embodiment has the progressively varying portion 27 at the part of the respective partitions 25 of the flow hole forming portion 20, it is possible to limit an unintended flow of the coolant into the fourth flow hole 24.

As discussed above, in the valve device 1 of the present embodiment, even in the case where the rotor 30 is stopped at the position, which is deviated in the forward rotation direction or the reverse rotation direction from the normal stop position of the rotor 30 at the time of executing any one of the first to fourth operation modes, it is possible to limit the unintended flow of the coolant into the unintended flow hole that is not intended to conduct the fluid. Specifically, the degree of sealing of the unintended flow hole, which is not intended to conduct the fluid, can be improved.

Figure 15:
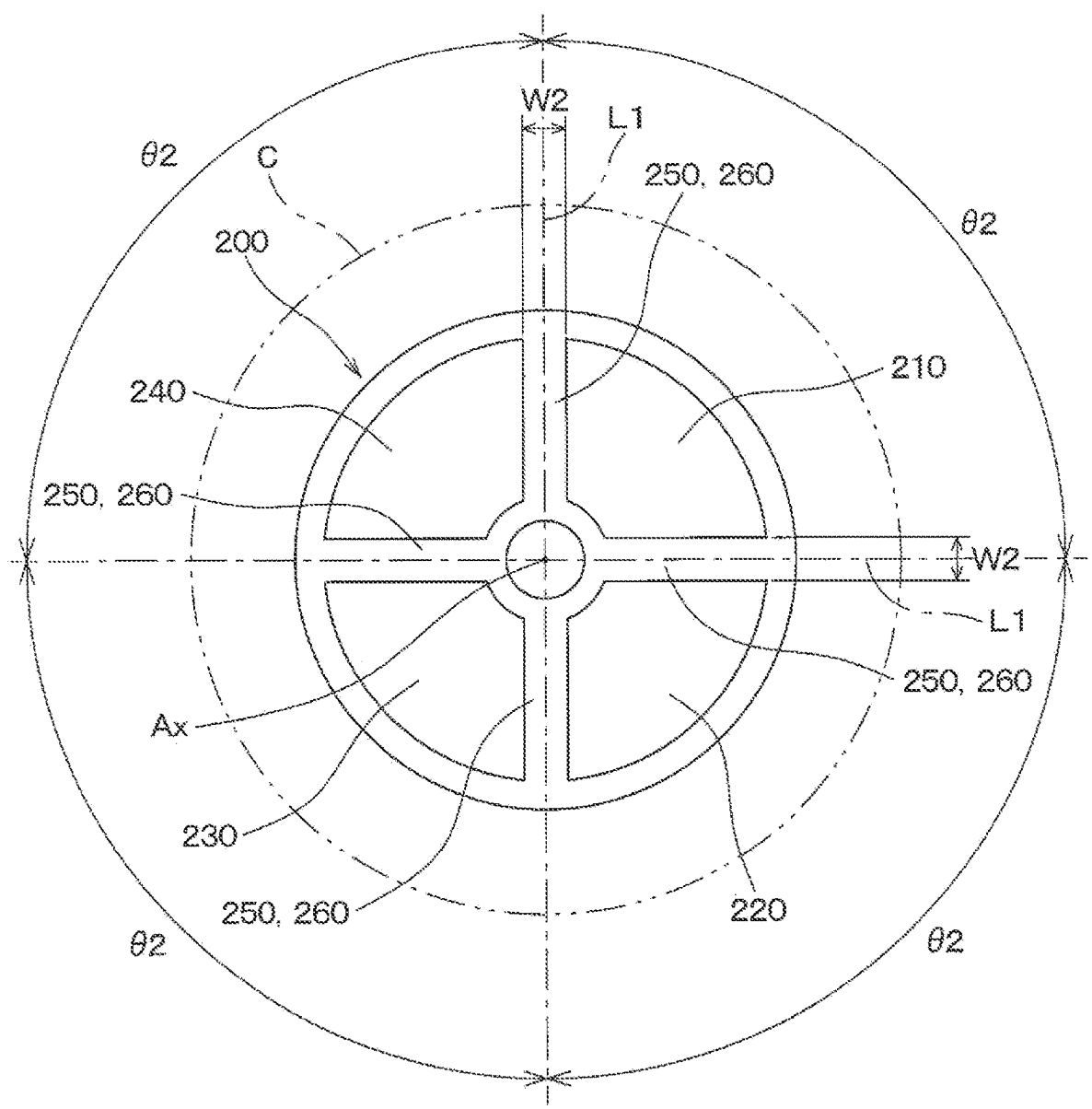
FIG. 15 is a plan view showing only a flow hole forming portion of a valve device of a comparative example.

For the purpose of comparing with the valve device 1 of the present embodiment described above, a valve device of a comparative example will be described with reference to FIGS. 15 to 18. FIG. 15 indicates only a flow hole forming portion 200 of the valve device of the comparative example, and FIG. 16 indicates only a rotor 300 of the valve device of the comparative example. Even in FIGS. 15 and 16, the imaginary circle C, which is centered on the rotational axis Ax of the rotor 300 and is perpendicular to the rotational axis Ax, is indicated by the dot-dot-dash line. The center of the imaginary circle C and the central axis of the flow hole forming portion 200 coincide with each other.

As shown in FIG. 15, the flow hole forming portion 200 of the valve device of the comparative example has four flow holes 210, 220, 230, 240 and four partitions 250. However, each of the four partitions 250 of the flow hole forming portion 200 of the comparative example only has the parallel portion 260 and does not have the progressively varying portion. Even in the comparative example, the parallel portion 260 extends in parallel with the primary imaginary line L1 such that the width of the parallel portion 260 is constant along the entire radial extent of the parallel portion 260 in the radial direction of the imaginary circle C. Here, it is assumed that the width W2 of the parallel portion 260 of the partition 250 of the valve device of the comparative example is the same as the width W1 of the parallel portion 26 of the partition 25 of the valve device 1 of the first embodiment. The width of the parallel portion 260, 26 is a size of the parallel portion 260, 26 measured in the circumferential direction of the imaginary circle C.

Figure 16:
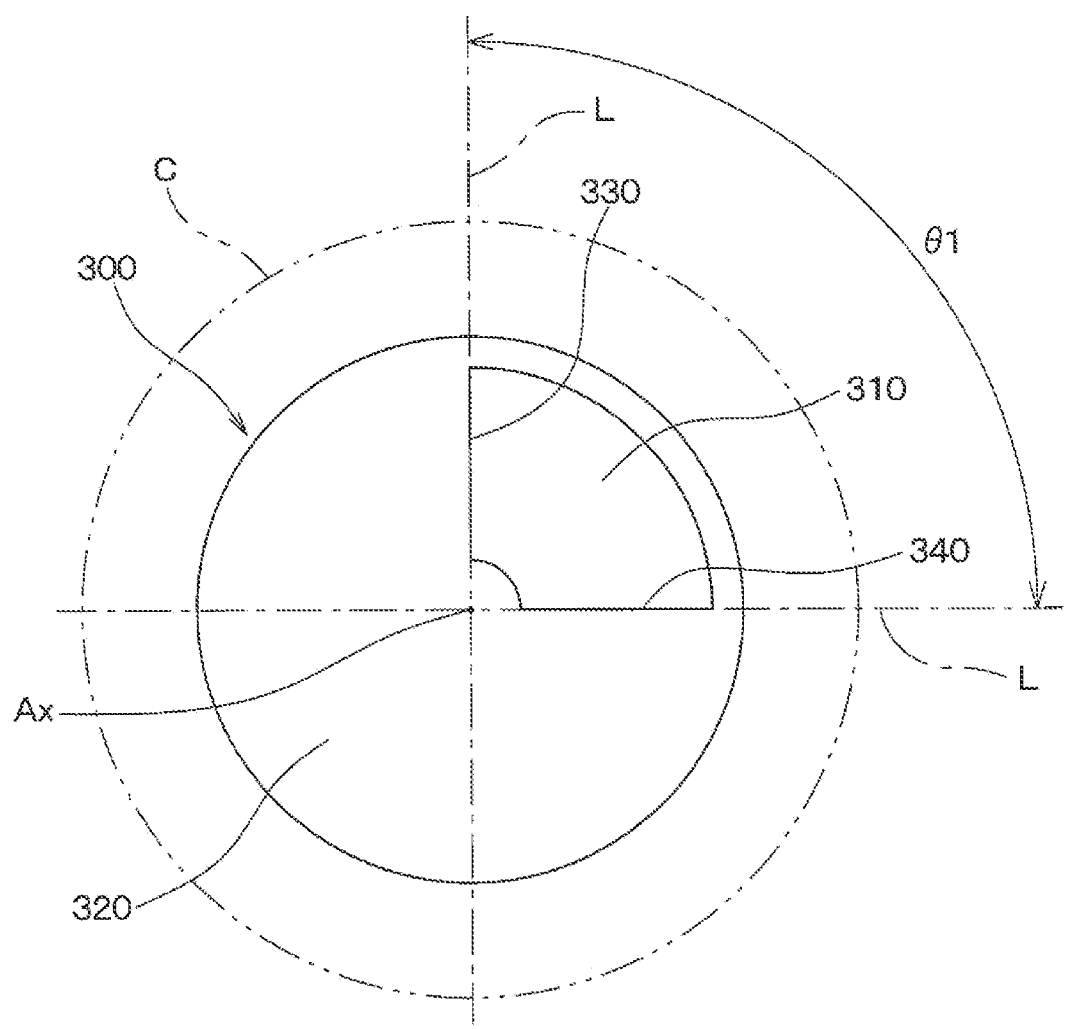
FIG. 16 is a plan view showing only a rotor of the valve device of the comparative example.

The rotor 300 of the valve device of the comparative example shown in FIG. 16 has the same structure as the rotor 30 of the valve device 1 of the first embodiment. Specifically, as shown in FIG. 16, the rotor 300 includes: the passage opening 310; and the closing portion 320 which is the remaining portion of the rotor 300 that is other than the passage opening 310. Two radial sections 330, 340 of the opening edge of the passage opening 310, which face each other in the circumferential direction of the imaginary circle C, respectively linearly extend along the corresponding imaginary line L which extends in the radial direction of the imaginary circle C. The angle θ1, which is defined between the radial sections 330, 340 facing each other in the circumferential direction of the imaginary circle C at the opening edge of the passage opening 310, coincides with the angle θ2 defined between the center lines of the circumferentially adjacent two of the partitions 250 of the flow hole forming portion 200.

Figure 17:
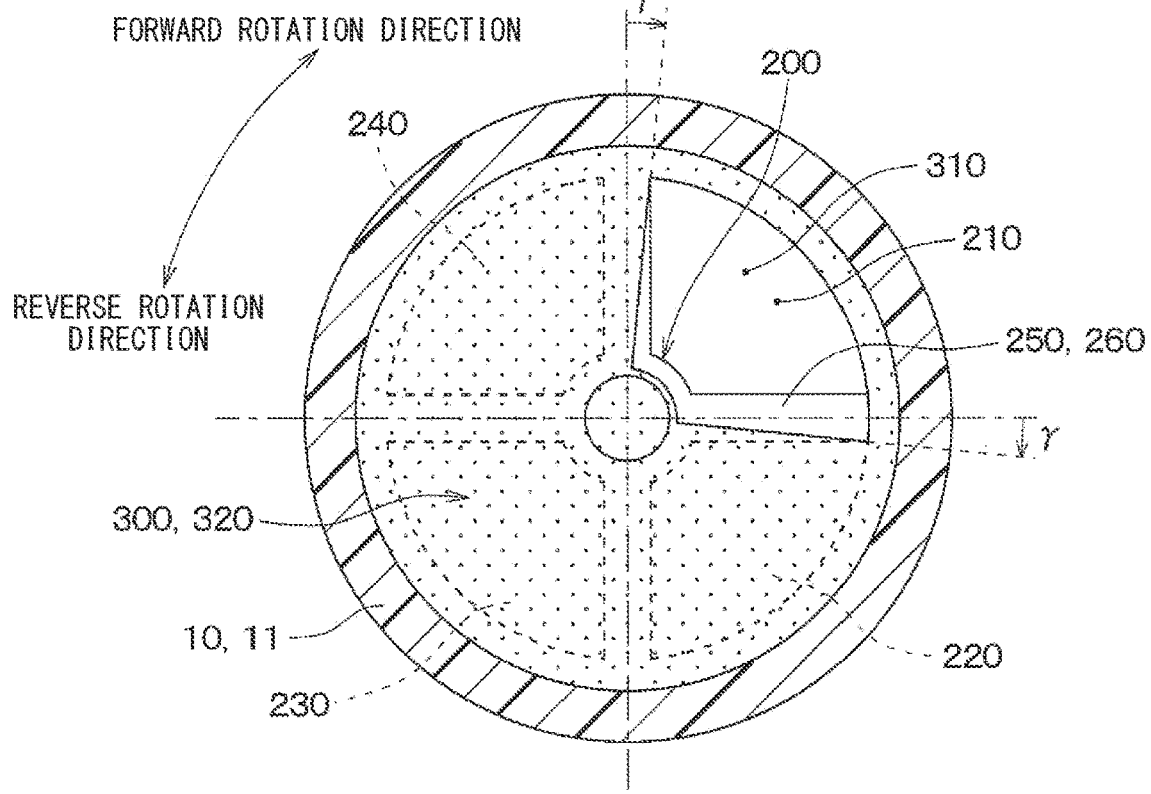
FIG. 17 is a diagram showing a state where a stop position of the rotor is deviated in the valve device of the comparative example.

FIG. 17 indicates a state where the rotor 300 is stopped at a position, which is deviated by a predetermined angle in the forward rotation direction from the normal stop position of the rotor 300, at the time when the valve device of the comparative example executes the first operation mode. In FIG. 17, the amount of positional deviation of the rotor 300 in the forward rotation direction relative to the normal stop position of the rotor 300 is indicated by an angle γ. The angle γ indicated in FIG. 17 is smaller than the angle α indicated in FIG. 12 described in the first embodiment. In the valve device of the comparative example, when the amount of positional deviation in the forward rotation direction relative to the normal stop position of the rotor 300 becomes larger than the angle γ, the unintended flow of the coolant is conducted into the second flow hole 220.

Figure 18:
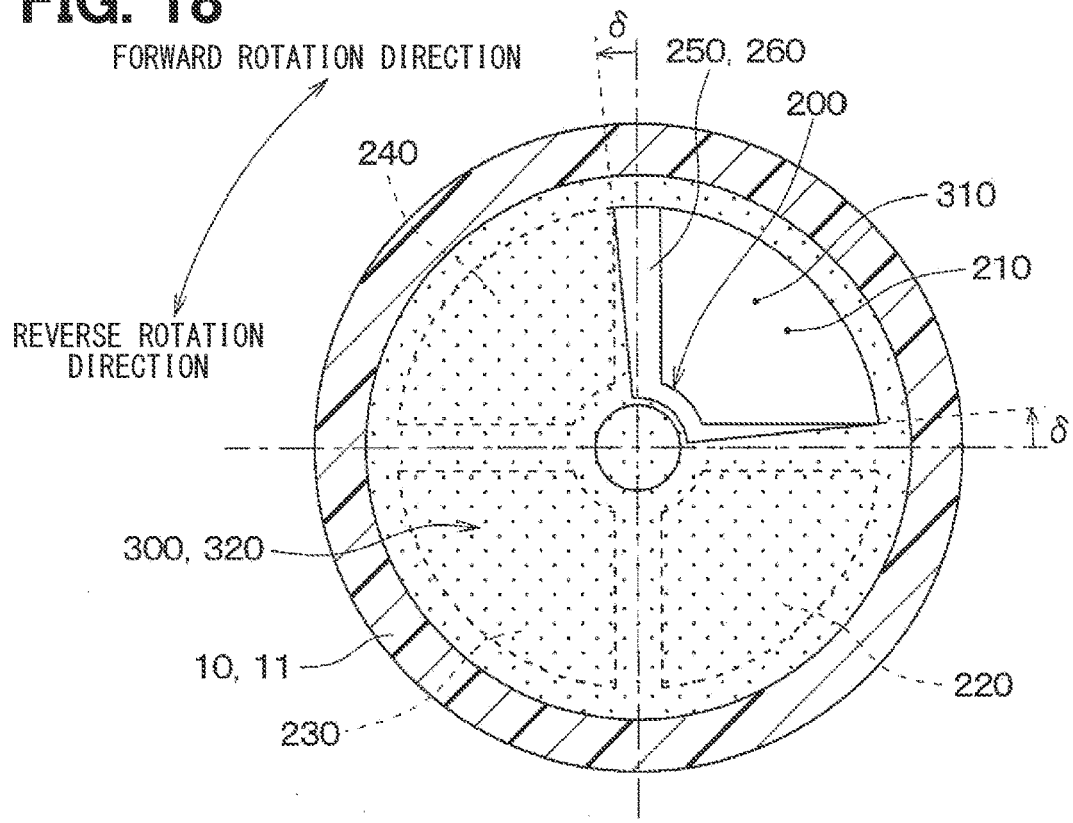
FIG. 18 is a diagram showing a state where the stop position of the rotor is deviated in the valve device of the comparative example.

Furthermore, FIG. 18 indicates a state where the rotor 300 is stopped at a position, which is deviated by a predetermined angle in the reverse rotation direction from the normal stop position of the rotor 300, at the time when the valve device of the comparative example executes the first operation mode. In FIG. 18, the amount of positional deviation of the rotor 300 in the reverse rotation direction relative to the normal stop position of the rotor 300 is indicated by an angle δ. The angle δ indicated in FIG. 18 is smaller than the angle β indicated in FIG. 13 described in the first embodiment. In the valve device of the comparative example, when the amount of positional deviation in the reverse rotation direction relative to the normal stop position of the rotor 300 becomes larger than the angle δ, the unintended flow of the coolant is conducted into the fourth flow hole 240. That is, the valve device of the comparative example has a small allowable range of variation with respect to the stop position of the rotor 300.

Even in the valve device of the comparative example, it is conceivable to increase the width W2 of the parallel portion 260 of the respective partitions 250 of the flow hole forming portion 200 to limit the unintended leakage of the fluid into the unintended flow hole, which is supposed to be closed, even in the case where the variation in the stop position of the rotor 300 is increased. However, in this configuration, a passage cross-sectional area of the respective flow holes 210, 220, 230, 240 of the flow hole forming portion 200 becomes small, and thereby a pressure loss of the fluid passing through the opened flow hole among the flow holes 210, 220, 230, 240 is disadvantageously increased.

In contrast to the valve device of the comparative example, the valve device 1 of the present embodiment provides the following actions and effects.

(1) In the valve device 1 of the present embodiment, each of the partitions 25 of the flow hole forming portion 20 has: the parallel portion 26, which extends in parallel with the primary imaginary line L1 that extends in the radial direction of the imaginary circle C; and the progressively varying portion 27, which is placed on the outer side of the parallel portion 26 in the radial direction.

With this configuration, at the time when the valve device 1 executes the predetermined operation mode, even in the case where the variation in the stop position of the rotor 30 occurs, since each of the partitions 25 of the flow hole forming portion 20 has the progressively varying portion 27, it is possible to limit the communication of the passage opening 31 with the unintended flow hole, which is supposed to be closed. Therefore, at the time of executing the predetermined operation mode, it is possible that the coolant flows into the intended flow hole and does not flow into the unintended flow hole which is supposed to be closed.

Furthermore, in the valve device of the comparative example described above, it is conceivable to increase the width W2 of the parallel portion 260 of the respective partitions 250 to limit the unintended leakage of the fluid into the unintended flow hole, which is supposed to be closed, in the case where the variation in the stop position of the rotor 300 occurs. In contrast, in the valve device 1 of the present embodiment, since each of the partitions 25 has the parallel portion 26 and the progressively varying portion 27, the passage cross-sectional area of the respective flow holes 21-24 of the flow hole forming portion 20 can be increased in comparison to the configuration, in which the width W2 of the parallel portion 260 of the respective partitions 250 is increased.

Therefore, in the valve device 1 of the present embodiment, in response to the occurrence of the variation in the stop position of the rotor 30, it is possible to improve the degree of sealing of the unintended flow hole, which is supposed to be closed, among the flow holes 21-24 of the flow hole forming portion 20, while limiting an increase in the pressure loss of the fluid, which flows through the opened flow hole among the flow holes 21-24.

(2) In the present embodiment, the first edge section 28 of the peripheral edge of the parallel portion 26, which faces in the circumferential direction of the imaginary circle C, is spaced by the predetermined distance from the primary imaginary line L1 toward the inside of the closest one of the flow holes 21-24, which is closest to the peripheral edge of the parallel portion 26, and the first edge section 28 extends in parallel with the primary imaginary line L1. Furthermore, the second edge section 29 of the outer periphery of the progressively varying portion 27, which faces in the circumferential direction of the imaginary circle C, extends along the secondary imaginary line L2, which radially extends and is tilted by the predetermined angle from the primary imaginary line L1 toward the inside of the corresponding closest flow hole 21-24.

With this configuration, when the variation in the stop position of the rotor 30 occurs, the corresponding radial section 33, 34 of the opening edge of the passage opening 31, which faces in the circumferential direction of the imaginary circle C, is aligned with the second edge section 29 of the corresponding outer periphery of the progressively varying portion 27, which faces in the circumferential direction of the imaginary circle C. Therefore, the degree of sealing of the unintended flow hole 21-24, which is supposed to be closed, can be improved against the variation in the stop position of the rotor 30 without unnecessarily increasing the width of the progressively varying portion 27. Thus, in this valve device 1, the passage cross-sectional area of the respective flow holes 21-24 of the flow hole forming portion 20 can be increased while limiting the increase in the pressure loss of the fluid passing through the opened flow hole among the flow holes 21-24.

(3) In the present embodiment, the exterior angle θ3, which is defined between the first edge section 28 and the second edge section 29 (i.e., the angle θ4 defined between the primary imaginary line L1 and the secondary imaginary line L2), is set in the range of 5° to 10°.

According to this configuration, in the case where the exterior angle θ3, which is defined between the first edge section 28 and the second edge section 29, is smaller than 5°, the width of the partition 25 becomes small. Therefore, it becomes difficult to limit the unintentional flow of the fluid into the other flow hole, which is supposed to be closed, in response to the occurrence of the variation in the stop position of the rotor 30. In contrast, in the case where the exterior angle θ3, which is defined between the first edge section 28 and the second edge section 29, is larger than 10°, the width of the partition 25 becomes large. Therefore, it becomes difficult to ensure the large passage cross-sectional area of the respective flow holes 21-24. Thus, in this valve device 1, the exterior angle θ3, which is defined between the first edge section 28 and the second edge section 29, is set in the range of 5° to 10°, so that it is possible to improve the degree of sealing of the unintended flow hole, which is not supposed to conduct the fluid, among the flow holes 21-24, and it is possible to limit an increase in the pressure loss of the fluid, which flows through the opened flow hole among the flow holes 21-24.

(4) In the present embodiment, when the radial length of the partition 25 is divided into the three equal parts, the connection point P between the first edge section 28 and the second edge section 29 is located in the center part among the three equal parts.

In a case where the connection point P between the first edge section 28 and the second edge section 29 is located in a radially outermost part among the three equal parts, it becomes difficult to limit the unintentional flow of the fluid into the other flow hole, which is supposed to be closed, in response to the occurrence of the variation in the stop position of the rotor 30. Furthermore, in a case where the connection point P between the first edge section 28 and the second edge section 29 is located in a radially innermost part among the three equal parts, it becomes difficult to ensure the large passage cross-sectional area of the respective flow holes 21-24. Thus, in the valve device 1, the connection point P between the first edge section 28 and the second edge section 29 is located in the center part among the three equal parts, so that the degree of sealing of the unintended flow hole, which is supposed to be closed, among the flow holes 21-24 can be improved, and the increase in the pressure loss of the fluid, which flows through the opened flow hole among the flow holes 21-24, can be limited.

(5) In the present embodiment, the operation mode of the drive device 40, in which the passage opening 31 is communicated with the corresponding predetermined flow hole and is blocked from the rest of the flow holes that is other than the corresponding predetermined flow hole, is changeable among two or more operation modes. In the present embodiment, there is described the example, in which the operation mode is changeable among the four operation modes.

Accordingly, in the valve device 1, in which the operation mode is changeable among the two or more operation modes, it is possible to limit an unnecessary increase in the width of the partition 25 and/or the inner diameter of the housing 10. Thus, in response to the occurrence of the variation in the stop position of the rotor 30, the degree of sealing of the unintended flow hole, which is not intended to conduct the fluid, can be improved, and the increase in the pressure loss of the fluid, which flows through the opened flow hole among the flow holes 21-24, can be limited.

(6) In the present embodiment, the flow holes 21-24 and the partitions 25 are alternately arranged in the circumferential direction of the imaginary circle C along the entire circumferential extent of the flow hole forming portion 20.

In the case where the flow holes 21-24 and the partitions 25 are arranged along the entire circumferential extent of the flow hole forming portion 20, when the width of the respective partitions 25 is increased, the passage cross-sectional area of the respective flow holes 21-24 is reduced. Thus, the pressure loss of the fluid, which flows through the opened flow hole among the flow holes 21-24 is increased.

In contrast, in the valve device 1 of the present embodiment, in the structure, in which the flow holes 21-24 and the partitions 25 are alternately arranged along the entire circumferential extent of the flow hole forming portion 20, each of the partitions 25 has the parallel portion 26 and the progressively varying portion 27, so that it is possible to ensure the large passage cross-sectional area of the respective flow holes 21-24. Thus, in this valve device 1, the improvement in the degree of sealing of the unintended flow hole, which is not intended to conduct the fluid, is achieved, and the increase in the pressure loss of the fluid conducted through the opened flow hole among the flow holes 21-24 is limited.

(7) The valve device 1 of the present embodiment includes the torsion spring (serving as the first urging member) 45 which urges the rotor 30 relative to the housing 10 toward the one side in the circumferential direction of the imaginary circle C.

Therefore, even in the case where the rotor 30 is rotated in the forward rotation direction and the reverse rotation direction, the members, which transmit the torque from the drive device 40 to the rotor 30, are always placed in contact with each other by the urging force of the torsion spring 45. This reduces the variation in the stopping position of the rotor 30, so that the exterior angle θ3 defined between the first edge section 28 and the second edge section 29 (i.e., the angle θ4 defined between the primary imaginary line L1 and the secondary imaginary line L2) can be reduced. Thus, in this valve device 1, the degree of sealing of the unintended flow hole, which is not intended to conduct the fluid, can be improved, and the passage cross-sectional area of the respective flow holes 21-24 of the flow hole forming portion 20 can be increased.

Second Embodiment

Next, a second embodiment will be described. The second embodiment is a modification of the first embodiment, in which the configuration of the flow hole forming portion 20 is changed, and the rest of the second embodiment is the same as that of the first embodiment. Therefore, only the portions, which are different from those of the first embodiment will be described in the following description.

Figure 14:
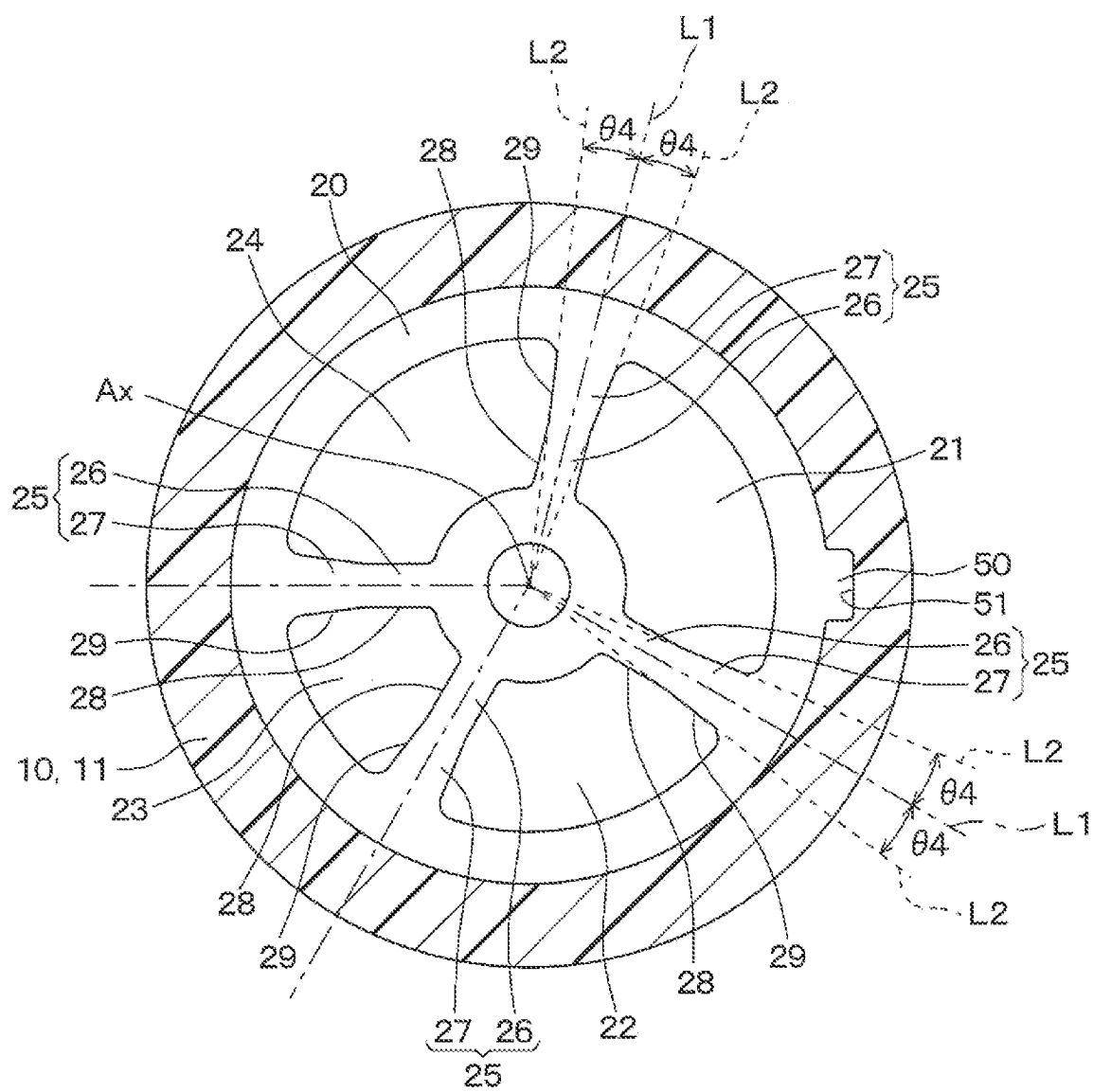
FIG. 14 is a cross-sectional view schematically showing a flow hole forming portion and a housing in a valve device of a second embodiment.

FIG. 14 indicates the flow hole forming portion 20, which is received in the passage of the housing 10, and the cross-section of the housing 10, in which the flow hole forming portion 20 is received, in the valve device 1 of the second embodiment. As shown in FIG. 14, the flow hole forming portion 20 of the valve device 1 of the second embodiment also includes the four flow holes 21-24 and the four partitions 25 while each of the partitions 25 is placed between the corresponding adjacent two of the flow holes 21-24. The four flow holes 21-24 and the four partitions 25 are alternately arranged in the circumferential direction of the flow hole forming portion 20 along the entire circumferential extent of the flow hole forming portion 20.

However, in the second embodiment, the sizes of the respective flow holes 21-24 are different from each other. The sizes of the flow holes 21-24 are arbitrarily set according to, for example, the required flow characteristics of the respective flow holes 21-24.

Even in the second embodiment, the four partitions 25 of the flow hole forming portion 20 have the identical shape. Each of the partitions 25 has the parallel portion 26 and the progressively varying portion 27. The parallel portion 26 extends in parallel with the primary imaginary line L1 such that the width of the parallel portion 26 is constant along the entire radial extent of the parallel portion 26 in the radial direction of the imaginary circle C. The progressively varying portion 27 is placed on the outer side of the parallel portion 26, and the width of the progressively varying portion 27, which is measured in the circumferential direction, is progressively increased toward the outer side in the radial direction.

The first edge section 28 of the peripheral edge of the parallel portion 26, which faces in the circumferential direction of the imaginary circle C, is spaced by the predetermined distance from the primary imaginary line L1 toward the inside of the closest one of the flow holes 21-24, which is closest to the peripheral edge of the parallel portion 26, and the first edge section 28 extends in parallel with the primary imaginary line L1. Furthermore, the second edge section 29 of the peripheral edge of the progressively varying portion 27, which faces in the circumferential direction of the imaginary circle C, extends along the secondary imaginary line L2. That is, the four partitions 25 of the flow hole forming portion 20 of the second embodiment are the same as the partitions 25 of the flow hole forming portion 20 of the first embodiment except that the locations of the partitions 25 in the circumferential direction are different from those of the first embodiment.

The flow hole forming portion 20 has a positioning projection 50 which is formed at an outer peripheral portion of the flow hole forming portion 20 shaped in a circular disk form and projects toward the outer side in the radial direction. The projection 50 is fitted into a groove 51 which is formed at an inner wall of the housing 10. With this configuration, the flow hole forming portion 20 is installed such that the flow hole forming portion 20 does not make relative rotation around the axis at the passage of the housing 10. The shape and the number of the projection(s) 50 and the shape and the number of the groove(s) 51 may be set arbitrarily.

The valve device 1 of the second embodiment described above can achieve the same actions and effects as those of the first embodiment.

Other Embodiments (1) In each of the above embodiments, the valve device 1 has been described as being used for the fluid circulation system installed on, for example, the electric vehicle. However, the present disclosure is not limited to this. For example, the valve device 1 may be used for a fluid circulation system of another type of vehicle that is other than the electric vehicle. Furthermore, the valve device 1 may be used for another application other than the vehicle.

(2) In each of the above embodiments, the fluid, which flows through the passage of the housing 10 of the valve device 1, is described as the coolant. However, the present disclosure is not limited to this. This fluid may be a liquid or gas other than the coolant.

(3) In each of the above embodiments, the valve device 1 is described as the five-way valve. However, the present disclosure is not limited to this. The valve device 1 may be formed as a two-way valve, a three-way valve, a four-way valve, a six or more way valve. Specifically, the number of the flow holes 21-24, the number of the partitions 25 of the flow hole forming portion 20 and the number of the passage opening(s) 31 of the rotor 30 may be set arbitrarily.

(4) In each of the above embodiments, there is described the rotor 30 which has the passage opening 31 and the closing portion 32. However, the present disclosure is not limited to this. The rotor 30 may have a recess that is recessed in the plate thickness direction of the rotor 30 from the flow hole forming portion 20 side toward the inlet communication chamber 100 side. In this case, the fluid, which is supplied from a predetermined fluid outlet, may flow through a communication chamber and a predetermined flow hole communicated with the predetermined fluid outlet and then flow in the recess of the rotor 30 and makes a U-turn. Thereafter, this fluid may flow through another flow hole and another communication chamber and may flow out from another fluid outlet.

(5) In each of the above embodiments, the housing 10 and the flow hole forming portion 20 of the valve device 1 are described as the different members, respectively. However, the present disclosure is not limited to this. The housing 10 and the flow hole forming portion 20 may be formed as a single molded component which is formed integrally in one-piece.

(6) In each of the above embodiments, the shape of the flow hole forming portion 20 and the shape of the rotor 30 in the valve device 1 are described as the form of the circular disk. However, the present disclosure is not limited to this. The shape of the flow hole forming portion 20 and the shape of the rotor 30 in the view taken in the axial direction of the rotational axis may be any of various forms, such as a form of a polygon, or a form of a rounded polygon, in which each corner is rounded. The material of the flow hole forming portion 20 and the material of the rotor 30 may be any of various types of materials, such as resin, ceramic or metal.

(7) In each of the above embodiments, the drive device 40 of the valve device 1 is described to have the electric motor 41 and the gear mechanism 42. However, the present disclosure is not limited to this. A rotating device, which is other than the electric motor 41, may be employed for the drive device 40. Furthermore, the gear mechanism 42 may be eliminated, and the electric motor 41 and the shaft 43 may be directly coupled with each other.

(8) In each of the above embodiments, there is described that the drive device 40 and the rotor 30 of the valve device 1 are coupled with each other through the shaft 43 and the coupling member 44. However, the present disclosure is not limited to this. The drive device 40 and the rotor 30 may be directly coupled with each other.

(9) In each of the above embodiments, each of the partitions 25 of the flow hole forming portion 20 is shaped identically. However, the present disclosure is not limited to this. One or more of the partitions 25 may have a shape that is different from the rest of the partitions 25.

(10) In the first embodiment, corners of the flow holes 21-24 of the flow hole forming portion 20 and corners of the passage opening 31 of the rotor 30 are not rounded. However, the present disclosure is not limited to this. The corners of the flow holes 21-24 of the flow hole forming portion 20 and the corners of the passage opening 31 of the rotor 30 may be rounded.

(11) In each of the above embodiments, the valve device 1 is described such that the fluid flows from the fluid inlet 12 of the housing 10 into the inside of the housing 10 and flows out from one of the four fluid outlets 13-16. However, the present disclosure is not limited to this. The valve device 1 may be used such that the fluid flows from one of the fluid outlets 13-16 of the housing 10 into the inside of the housing 10 and flows out from the fluid inlet 12.

(12) The present disclosure is not limited to the above-described embodiments and may be implemented in various variations. Further, the above embodiments are not unrelated to each other and can be appropriately combined unless the combination is clearly impossible. Needless to say, in each of the above-described embodiments, the elements of the embodiment are not necessarily essential except when it is clearly indicated that they are essential and when they are clearly considered to be essential in principle. In each of the above embodiments, when a numerical value such as the number, numerical value, amount, range or the like of the constituent elements of the embodiment is mentioned, the present disclosure should not be limited to such a numerical value unless it is clearly stated that it is essential and/or it is required in principle. In each of the above embodiments, when the material, the shape, the positional relationship or the like of the constituent elements of the embodiment is mentioned, the present disclosure should not be limited to the material, the shape, the positional relationship or the like unless it is clearly stated that it is essential and/or it is required in principle.

What is claimed is:

1. A valve device comprising:
   a housing that has a passage configured to conduct fluid;
   a flow hole forming portion that is fixed at the passage of the housing and includes:
   a plurality of flow holes, each of which is configured to conduct the fluid; and
   at least one partition which is placed between corresponding adjacent two of the plurality of flow holes;
   a rotor that is placed in the passage of the housing and is configured to rotate about a rotational axis which is predetermined, wherein the rotor includes:
   a passage opening which is configured to communicate with a corresponding predetermined flow hole among the plurality of flow holes of the flow hole forming portion according to a rotation angle of the rotor; and
   a closing portion which is configured to close a rest of the plurality of flow holes that is other than the corresponding predetermined flow hole; and
   a drive device that is configured to output a torque which rotates the rotor, wherein:
   a circle, which is centered on the rotational axis of the rotor and is perpendicular to the rotational axis, is defined as an imaginary circle;
   an opening edge of the passage opening of the rotor has a radial section, wherein the radial section faces in a circumferential direction of the imaginary circle and extends along an imaginary line which extends in a radial direction of the imaginary circle; and the at least one partition of the flow hole forming portion has:
- a parallel portion which extends in parallel with the radial direction of the imaginary circle; and
- a progressively varying portion which is placed on an outer side of the parallel portion in the radial direction, wherein a width of the progressively varying portion, which is measured in the circumferential direction, is progressively increased toward the outer side in the radial direction.

2. The valve device according to claim 1, wherein:

a peripheral edge of the parallel portion has a first edge section, which faces in the circumferential direction of the imaginary circle, wherein the first edge section is spaced by a predetermined distance from a primary imaginary line, which is predetermined and extends in the radial direction of the imaginary circle, toward an inside of a closest one of the corresponding adjacent two of the plurality of flow holes, which is closest to the peripheral edge of the parallel portion, and the first edge section extends in parallel with the primary imaginary line; and a peripheral edge of the progressively varying portion has a second edge section, which faces in the circumferential direction of the imaginary circle, wherein the second edge section extends along a secondary imaginary line, which radially extends and is tilted by a predetermined angle from the primary imaginary line toward the inside of the closest one of the corresponding adjacent two of the plurality of flow holes.

3. The valve device according to claim 2, wherein an exterior angle, which is defined between the first edge section and the second edge section, is in a range of 5° to 10°.

4. The valve device according to claim 2, wherein when a radial length of the at least one partition is divided into three equal parts, a connection point between the first edge section and the second edge section is located in a center part among the three equal parts.

5. The valve device according to claim 1, wherein an operation mode of the drive device, in which the passage opening is communicated with the corresponding predetermined flow hole and is blocked from the rest of the plurality of flow holes that is other than the corresponding predetermined flow hole, is changeable among two or more operation modes.

6. The valve device according to claim 1, wherein:
the at least one partition is a plurality of partitions; and
the plurality of flow holes and the plurality of partitions are alternately arranged in the circumferential direction of the imaginary circle along an entire circumferential extent of the flow hole forming portion.

7. The valve device according to claim 1, comprising an urging member that is placed around the rotational axis of the rotor and has:
one end portion which is anchored to the housing or a member fixed to the housing; and
another end portion which is anchored to the rotor or a member fixed to the rotor, wherein the urging member is configured to urge the rotor relative to the housing toward one side in the circumferential direction of the imaginary circle.

* * * * *